US011917444B2

United States Patent
Huang et al.

(10) Patent No.: US 11,917,444 B2
(45) Date of Patent: Feb. 27, 2024

(54) CHANNEL STATE INFORMATION FEEDBACK IN WIRELESS COMMUNICATION

(71) Applicant: QUALCOMM Incorporated, San Diego, CA (US)

(72) Inventors: Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/529,076

(22) Filed: Nov. 17, 2021

(65) Prior Publication Data

US 2022/0330067 A1 Oct. 13, 2022

Related U.S. Application Data

(60) Provisional application No. 63/172,620, filed on Apr. 8, 2021.

(51) Int. Cl.
*H04B 17/345* (2015.01)
*H04W 24/10* (2009.01)

(52) U.S. Cl.
CPC .......... *H04W 24/10* (2013.01); *H04B 17/345* (2015.01)

(58) Field of Classification Search
CPC . H04B 17/345; H04L 1/0026; H04L 25/0226; H04L 5/0048; H04L 5/0082; H04L 5/0091; H04L 1/0027; H04L 5/0023; H04L 5/0033; H04L 5/0073; H04L 5/1469; H04W 24/10
See application file for complete search history.

(56) References Cited

FOREIGN PATENT DOCUMENTS

WO WO-2014023221 A1 * 2/2014 ........ H04W 36/0083

* cited by examiner

*Primary Examiner* — Melvin C Marcelo
*Assistant Examiner* — Natali Pascual Peguero
(74) *Attorney, Agent, or Firm* — Loza & Loza, LLP

(57) ABSTRACT

Aspects of the disclosure relate to wireless communication using channel state information (CSI) correlation information for determining the validity of a CSI report. A user equipment (UE) can determine the CSI correlation information based on reference signal resources scheduled for measuring CSI and interference on a channel between the UE and a network entity. In some aspects, the CSI correlation information can be determined based on channel correlation information and/or interference correlation information.

30 Claims, 14 Drawing Sheets

CHANNEL STATE INFORMATION FEEDBACK IN WIRELESS COMMUNICATION

PRIORITY CLAIM

This application claims priority to and the benefit of provisional patent application No. 63/172,620 filed in the United States Patent Office on Apr. 8, 2021, the entire content of which is incorporated herein by reference as if fully set forth below in its entirety and for all applicable purposes.

TECHNICAL FIELD

The technology discussed below relates generally to wireless communication systems, and more particularly, to channel state information feedback in wireless communication.

INTRODUCTION

Wireless communication systems are widely deployed to provide various telecommunication services such as telephony, video, data, messaging, and broadcasts. Technologies have been adopted in various telecommunication standards to provide a common protocol that enables different wireless devices to communicate on a municipal, national, regional, and even global level. An exemplary telecommunication standard is 5G New Radio (NR). 5G NR is part of a continuous mobile broadband evolution promulgated by Third Generation Partnership Project (3GPP) to meet new requirements associated with latency, reliability, security, scalability, and other requirements.

Data throughput and reliability are expected to be greatly increased in 5G NR. Therefore, accurate and up-to-date channel state information knowledge at the network side is important for network performance. Channel state information (CSI) estimation is a procedure used to determine channel quality in wireless communication. A network entity (e.g., a base station) can transmit a channel state information (CSI) reference signal (CSI-RS) for facilitating channel and interference estimation and reporting by a user equipment (UE).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to wireless communication using channel state information (CSI) correlation information for determining the validity of a CSI report. A user equipment (UE) can determine the CSI correlation information based on reference signal resources scheduled for measuring CSI and/or interference on a communication channel between the UE and a network entity. In some aspects, the CSI correlation information can be determined based on channel correlation information and/or interference correlation information.

An aspect of the present disclosure provides a user equipment (UE) for wireless communication. The UE includes a transceiver for wireless communication, a memory, and a processor coupled to the transceiver and the memory. The processor and the memory are configured to receive, using the transceiver, channel state information reference signal (CSI-RS) information from a scheduling entity. The processor and the memory are further configured to acquire, based on the CSI-RS information, channel state information (CSI) and CSI correlation information for determining a validity of the CSI. The processor and the memory are further configured to transmit, using the transceiver, a CSI report to the scheduling entity, the CSI report including the CSI and the CSI correlation information.

An aspect of the present disclosure provides a method of wireless communication at a user equipment (UE). The method includes receiving, from a scheduling entity, channel state information reference signal (CSI-RS) information. The method further includes acquiring, based on the CSI-RS information, channel state information (CSI) and CSI correlation information for determining a validity of the CSI. The method further includes transmitting a CSI report to the scheduling entity, the CSI report including the CSI and the CSI correlation information.

An aspect of the present disclosure provides a scheduling entity for wireless communication. The scheduling entity includes a transceiver for wireless communication with a user equipment (UE), a memory, and a processor coupled to the transceiver and the memory. The processor and the memory are configured to transmit, to the UE using the transceiver, channel state information reference signal (CSI-RS) information for configuring the UE to acquire channel state information (CSI) and CSI correlation information for determining a validity of the CST. The processor and the memory are further configured to receive, from the UE using the transceiver, a CSI report including the CSI and the CSI correlation information.

An aspect of the present disclosure provides a method for wireless communication at a scheduling entity. The method includes transmitting, to a user equipment (UE), channel state information reference signal (CSI-RS) information for configuring the UE to acquire channel state information (CSI) and CSI correlation information for determining a validity of the CSI. The method further includes receiving, from the UE, a CSI report comprising the CSI and the CSI correlation information.

An aspect of the present disclosure provides a user equipment (UE) for wireless communication. The UE includes a transceiver for wireless communication, a memory, and a processor coupled to the transceiver and the memory. The processor and the memory are configured to receive, using the transceiver, a reference signal from a scheduling entity. The processor and the memory are further configured to acquire, based on the reference signal, channel state information (CSI) and CSI correlation information for determining a validity of a CSI report. The processor and the memory are further configured to transmit, using the transceiver, the CSI report to the scheduling entity, the CSI report comprising the CSI and the CSI correlation information.

Another aspect of the disclosure provides a scheduling entity for wireless communication. The scheduling entity includes a transceiver for wireless communication with a user equipment (UE), a memory, and a processor coupled to the transceiver and the memory. The processor and the memory are configured to transmit, to the UE, reference signal information for configuring the UE to acquire channel state information (CSI) and CSI correlation information for determining a validity of a CSI report. The processor and the memory are further configured to transmit a reference signal using resources according to the reference signal information. The processor and the memory are further configured to receive the CSI report including the CSI and the CSI correlation information.

Another aspect of the disclosure provides a method of wireless communication at a user equipment (UE). The method includes receiving a reference signal from a scheduling entity. The method further includes acquiring, based on the reference signal, channel state information (CSI) and CSI correlation information for determining a validity of a CSI report. The method further includes transmitting the CSI report to the scheduling entity, the CSI report including the CSI and the CSI correlation information.

Another aspect of the disclosure provides a method of wireless communication at a scheduling entity. The method includes transmitting, to a user equipment (UE), reference signal information for configuring the UE to acquire channel state information (CSI) and CSI correlation information for determining a validity of a CSI report. The method further includes transmitting a reference signal using resources according to the reference signal information. The method further includes receiving the CST report including the CSI and the CSI correlation information.

Another aspect of the disclosure provides a user equipment (UE) for wireless communication. The UE includes means for receiving a reference signal from a scheduling entity. The UE further includes means for acquiring, based on the reference signal, channel state information (CSI) and CSI correlation information for determining a validity of a CSI report. The UE further includes means for transmitting the CST report to the scheduling entity, the CST report including the CSI and the CST correlation information.

Another aspect of the disclosure provides a scheduling entity for wireless communication. The scheduling entity includes means for transmitting, to a user equipment (UE), reference signal information for configuring the UE to acquire channel state information (CSI) and CSI correlation information for determining a validity of a CSI report. The scheduling entity further includes means for transmitting a reference signal using resources according to the reference signal information. The scheduling entity further includes means for receiving the CSI report including the CSI and the CSI correlation information.

Another aspect of the disclosure provides a computer-readable medium stored with executable code for wireless communication. The executable code includes instructions that cause a user equipment (UE) to receive a reference signal from a scheduling entity. The executable code further includes instructions that cause the UE to acquire, based on the reference signal, channel state information (CSI) and CSI correlation information for determining a validity of a CSI report. The executable code further includes instructions that cause the UE to transmit the CSI report to the scheduling entity, the CSI report comprising the CSI and the CSI correlation information.

Another aspect of the disclosure provides a computer-readable medium stored with executable code for wireless communication. The executable code includes instructions that cause a scheduling entity to transmit, to a user equipment (UE), reference signal information for configuring the UE to acquire channel state information (CSI) and CSI correlation information for determining a validity of a CSI report. The executable code further includes instructions that cause the scheduling entity to transmit a reference signal using resources according to the reference signal information. The executable code further includes instructions that cause the scheduling entity to receive the CSI report comprising the CSI and the CSI correlation information.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various examples discussed herein. In similar fashion, while exemplary implementations may be discussed below as device, system, or method examples, it should be understood that such examples can be implemented in various devices, systems, and methods.

DETAILED DESCRIPTION

Figure 1:
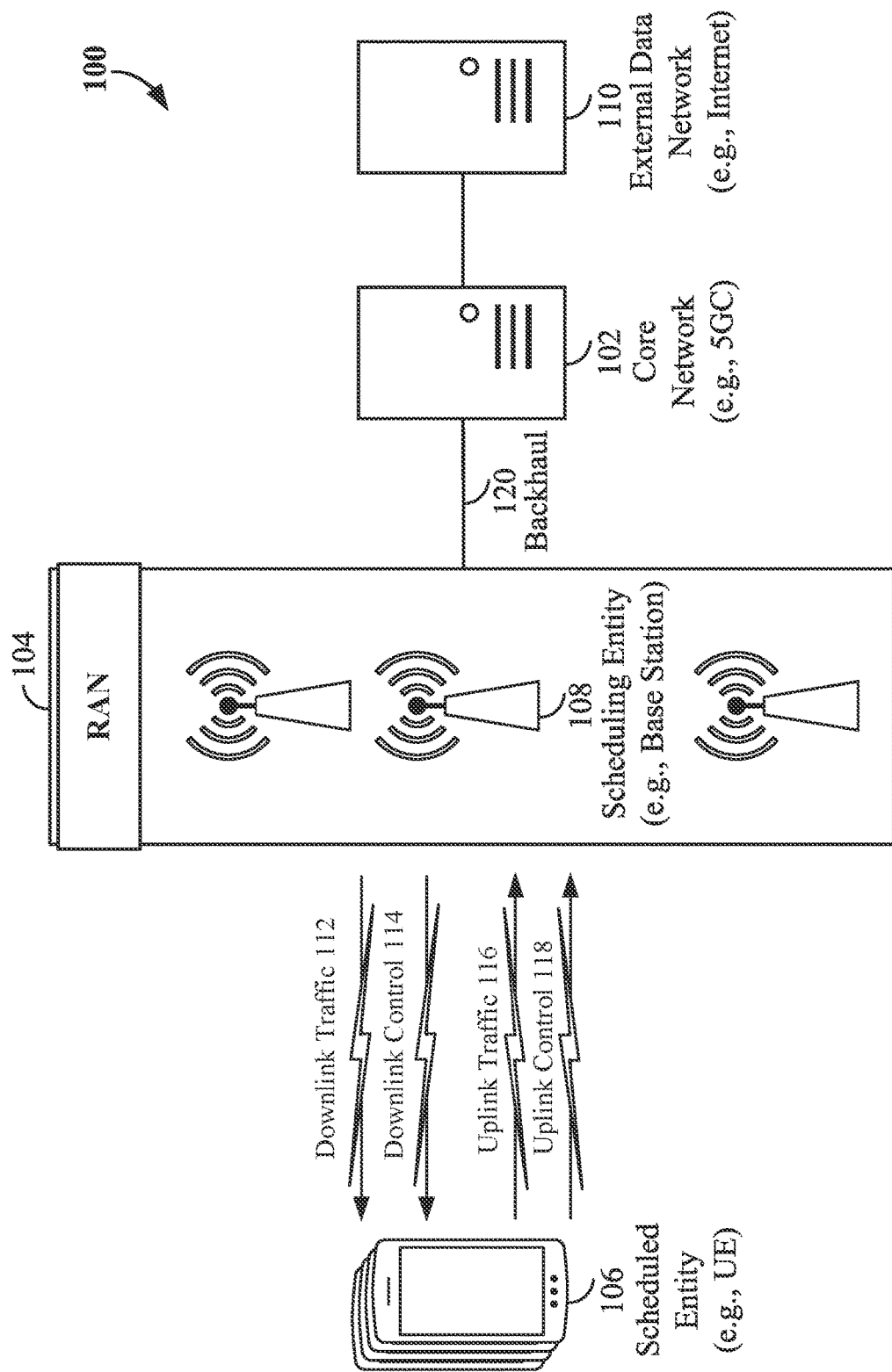
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

Aspects of the disclosure relate to wireless communication using channel state information (CSI) correlation information for determining the validity of a CSI report. A user equipment (UE) can determine the CSI correlation information based on reference signal resources scheduled for measuring CSI and interference on a communication channel between the UE and a scheduling entity. In some aspects, the CSI correlation information can be determined based on channel correlation information and/or interference correlation information determined based on the reference signal resources. The scheduling entity can determine the validity of the CSI report based on the CSI correlation information.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller: agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
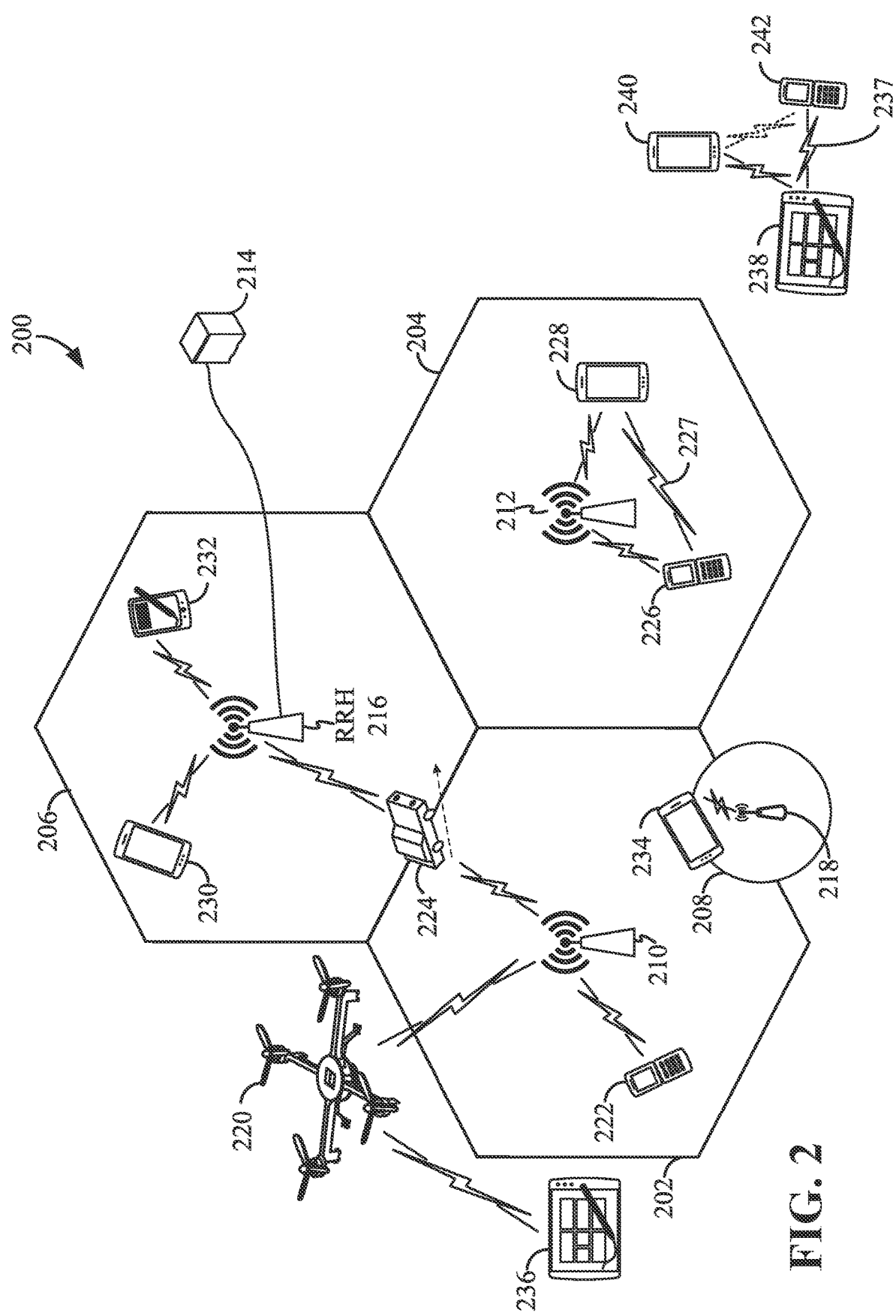
FIG. 2 is an illustration of an example of a radio access network according to some aspects of the disclosure.

Referring now to FIG. 2, by way of example and without limitation, a schematic illustration of a radio access network (RAN) 200 according to some aspects of the present disclosure is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly. e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
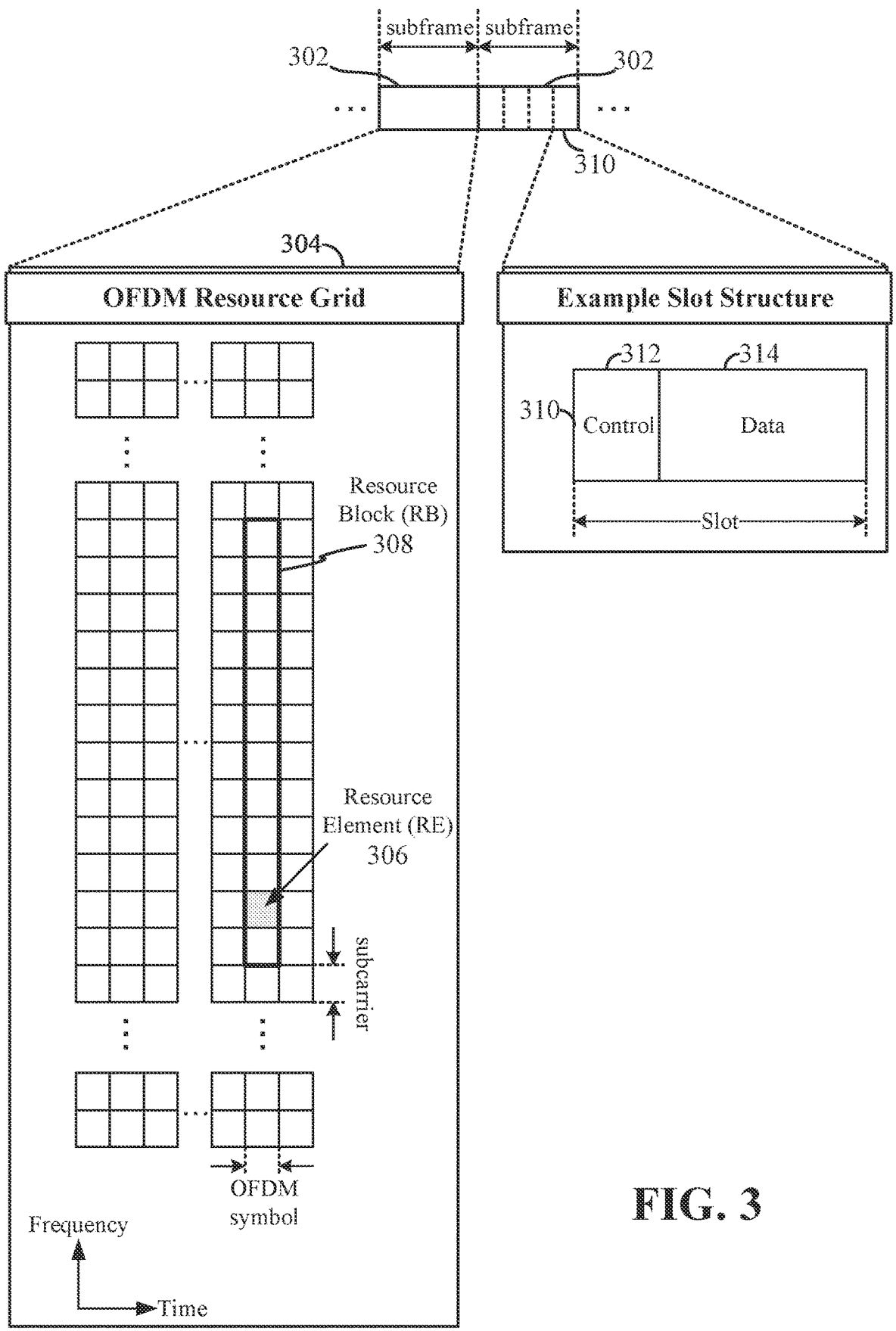
FIG. 3 is a schematic illustration of an organization of wireless resources in an air interface utilizing orthogonal frequency divisional multiplexing (OFDM) according to some aspects of the disclosure.

Referring now to FIG. 3, an expanded view of an exemplary subframe 302 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed-loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy. e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR). i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
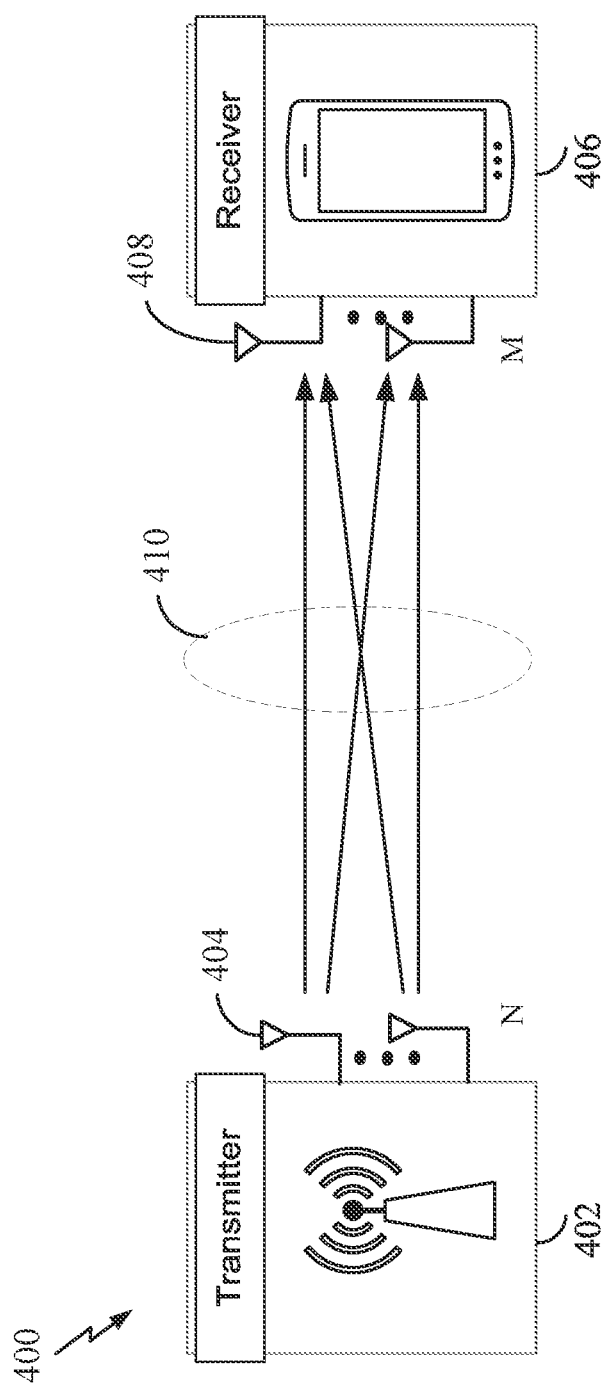
FIG. 4 is a block diagram illustrating a wireless communication system supporting multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 or higher (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR sidelink (SL) or V2X, utilizing FR2.

Channel State Information

In a 5G NR network (e.g., RAN 200), channel state information (CSI) can provide various information on the channel condition between a scheduling entity (e.g., gNB) and a scheduled entity (e.g., UE). A UE can measure a reference signal, such as an SSB or CSI-RS, transmitted by the network to determine the CSI. For example, the UE can measure the signal-to-noise-plus-interference (SINR) or reference signal received power (RSRP) associated with the reference signal to obtain the CSI. In some examples, CSI can include a channel quality information (CQI), a precoding matrix indicator (PMI), a strongest layer indicator (SLI), a rank indicator (RI), etc. The UE may provide the CSI to the scheduling entity in a CSI report. In some examples, the CSI report may include a Layer 1 (L1) measurement report including the L1-RSRP or L1-SINR beam measurement of one or more beams associated with one or more reference signals (e.g., SSB beams or CSI-RS beams). Each beam identifier (ID) of a reference signal beam to be measured may be indicated, for example, via a CSI-RS resource indicator (CRI) or an SSB resource indicator (SSBRI).

Based on the CSI report, the scheduling entity can select a rank for the scheduled entity (e.g., based on the RI), along with a precoding matrix (e.g., based on the PMI) and a MCS (e.g., based on the CQI) to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The SLI may be utilized to indicate which column of the precoding matrix of the reported PMI corresponds to the strongest layer codeword corresponding to the largest reported wideband CQI. The scheduling entity may further select one or more beams on which to communicate with the scheduled entity. In some aspects, the scheduled entity (e.g., a UE) can transmit CSI feedback to the scheduling entity via a periodic CSI report in a PUCCH, a semi persistent CSI report in a PUCCH or PUSCH, and/or an aperiodic CSI report in a PUSCH. In some aspects, the scheduling entity can trigger a CSI report by an UL grant or DL grant.

Figure 5:
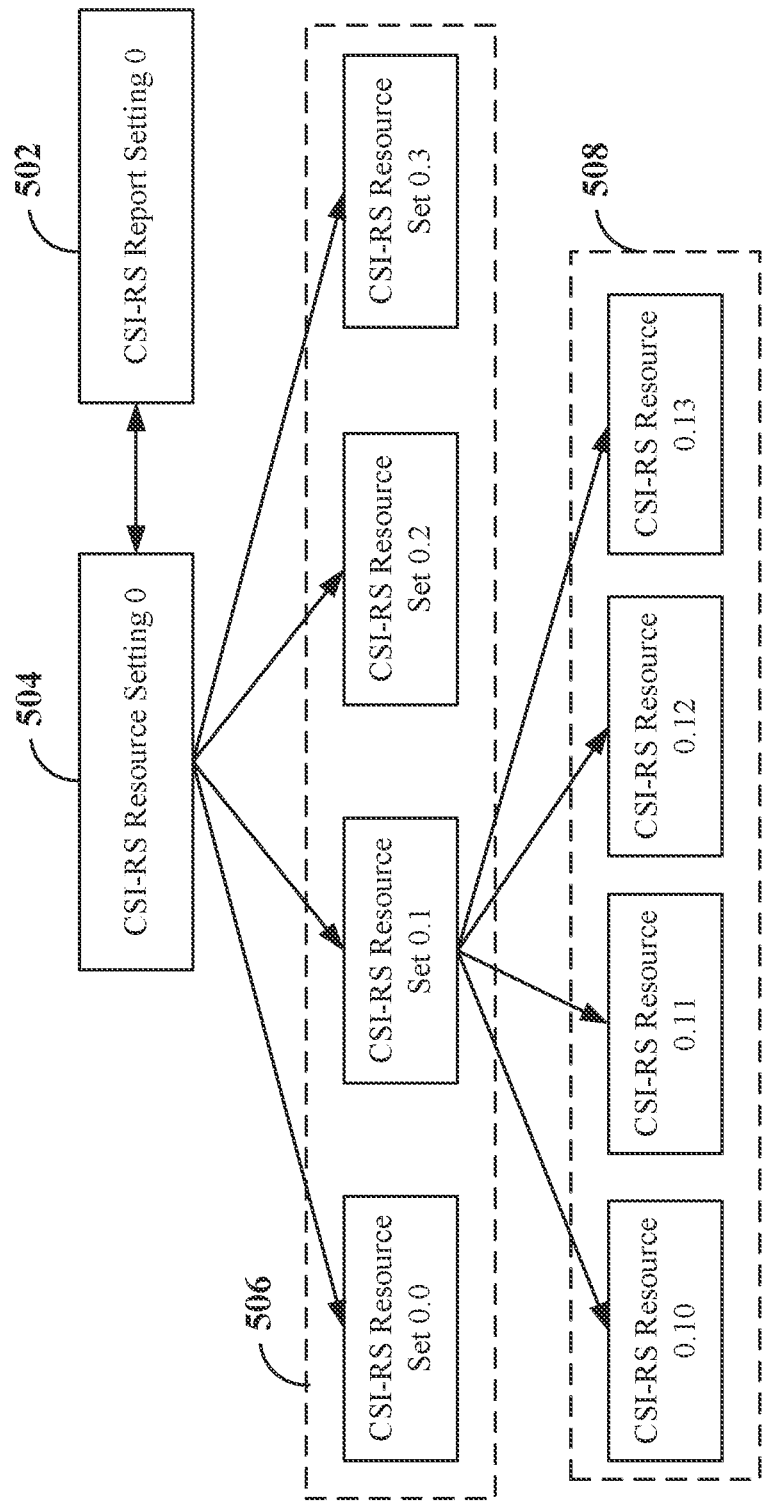
FIG. 5 is a diagram illustrating an example of channel state information (CSI) resource mapping according to some aspects of the disclosure.

FIG. 5 illustrates an exemplary CSI resource mapping to support different report/measurement configurations. The CSI resource mapping includes CSI report setting 502, CSI resource settings 504. CSI resource sets 506, and CSI resources 508. Each CSI resource setting 504 includes one or more CSI resource sets 506, and each CSI resource set 506 includes one or more CSI resources 508. In the example shown in FIG. 5, a single CSI resource setting (e.g., CSI resource setting 0) is illustrated. However, it should be understood that any suitable number of CSI resource settings 504 may be supported.

Each CSI report setting 502 may include a reportQuantity that indicates, for example, the specific CSI parameters and granularity thereof (e.g., wideband/sub-band CQI, PMI, RI, SLI, etc.), or L1 parameters (e.g., L1-RSRP, L1-SINR) to include in a CSI report. The CSI report setting 502 may further indicate a periodicity of the CSI report. For example, the CSI report setting 502 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 502 may further include a respective priority and other suitable parameters.

Each CSI report setting 502 may be linked to a CSI resource setting 504. Each CSI resource setting 504 may be associated with a particular time-domain behavior of reference signals. For example, each CSI resource setting 504 may include periodic, semi-persistent, or aperiodic CSI resources 508. For periodic and semi-persistent CSI resource settings 504, the number of configured CSI resource sets 506 may be limited to one. In general, the CSI resource settings 504 that may be linked to a particular CSI report setting 502 may be limited by the time-domain behavior of the CSI resource setting 504 and the CSI report setting 502. For example, an aperiodic CSI report setting 502 may be linked to periodic, semi-persistent, or aperiodic CSI resource settings 504. However, a semi-persistent CSI report setting 502 may be linked to only periodic or semi-persistent CSI resource settings 504. In addition, a periodic CSI report setting 502 may be linked to only a periodic CSI resource setting 504.

Each CSI resource set 506 may be associated with a CSI resource type. For example, CSI resource types may include non-zero-power (NZP) CSI-RS resources, SSB resources, or channel state information interference measurement (CSI-IM) resources (e.g., zero-power (ZP) CSI-RS). Thus, the CSI resources 508 may include channel measurement resources (CMRs), such as NZP CSI-RS or SSB resources, and/or interference measurement resources (IMRs), such as CSI-IM resources. Each CSI resource set 506 includes a list of CSI resources 508 of a particular CSI resource type. In addition, each CSI resource set 506 may further be associated with one or more of a set of frequency resources (e.g., a bandwidth and/or OFDM symbol(s) within a slot), a particular set of ports, a power, or other suitable parameters.

Each CSI resource 508 indicates the particular beam (e.g., ports), frequency resource, and OFDM symbol on which the reference signal may be measured by the wireless communication device. For example, each CSI-RS resource 508 may indicate an RE (e.g., RE 306) on which a CSI-RS pilot or SSB transmitted from a particular set of ports (e.g., on a particular beam) may be measured. In the example shown in FIG. 5, CSI-RS resource set 0.1 includes four CSI-RS resources (CSI-RS resource 0.10, CSI-RS resource 0.11, CSI-RS resource 0.12, and CSI-RS resource 0.13). Each CSI resource 508 may further be indexed by a respective beam identifier (ID). The beam ID may identify not only the particular beam (e.g., ports), but also the resources on which the reference signal may be measured. For example, the beam ID may include a CSI-RS resource indicator (CRI) or an SSB resource indicator (SSBRI).

A scheduling entity (e.g., gNB) may configure a scheduled entity (e.g., UE) with one or more CSI report settings 502 and CSI resource settings 504 via, for example, radio resource control (RRC) signaling. For example, the scheduling entity may configure the scheduled entity with a list of periodic CSI report settings 502 indicating the associated CSI resource set 506 that the scheduled entity may utilize to generate periodic CSI reports. As another example, the scheduling entity may configure the scheduled entity with a list of aperiodic CSI report settings in a CSI-AperiodicTriggerStateList. Each trigger state in the CSI-AperiodicTriggerStateList may include a list of aperiodic CSI report settings 502 indicating the associated CSI resource sets 506 for channel (and optionally interference) measurement. As another example, the scheduling entity may configure the scheduled entity with a list of semi-persistent CSI report settings in a CSI-SemiPersistentOnPUSCH-TriggerStateList. Each trigger state in the CSI-SemiPersistentOnPUSCH-TriggerStateList may include one CSI report setting 502 indicating the associated CSI resource set 506. The scheduling entity may then trigger one or more of the aperiodic or semi-persistent trigger states using, for example, DCI. As indicated above, a MAC-CE may be used to activate or deactivate a semi-persistent CSI report setting for a CSI report sent on the PUCCH.

For L1-RSRP measurement reports, the scheduled entity may be configured with a CSI resource setting 504 having up to sixteen CSI resource sets 506. Each of the CSI resource sets 506 may include up to sixty-four CSI resources 508 in each set. In some aspects, the total number of different CSI resources 508 over all the CSI resource sets 506 may be no more than 128. For L1-SINR measurement reports, the scheduled entity may be configured with a CSI resource setting 504 that can include up to 64 CSI resources 508 (e.g., up to 64 CSI-RS resources or up to 64 SSB resources).

CSI Reporting

Figure 6:
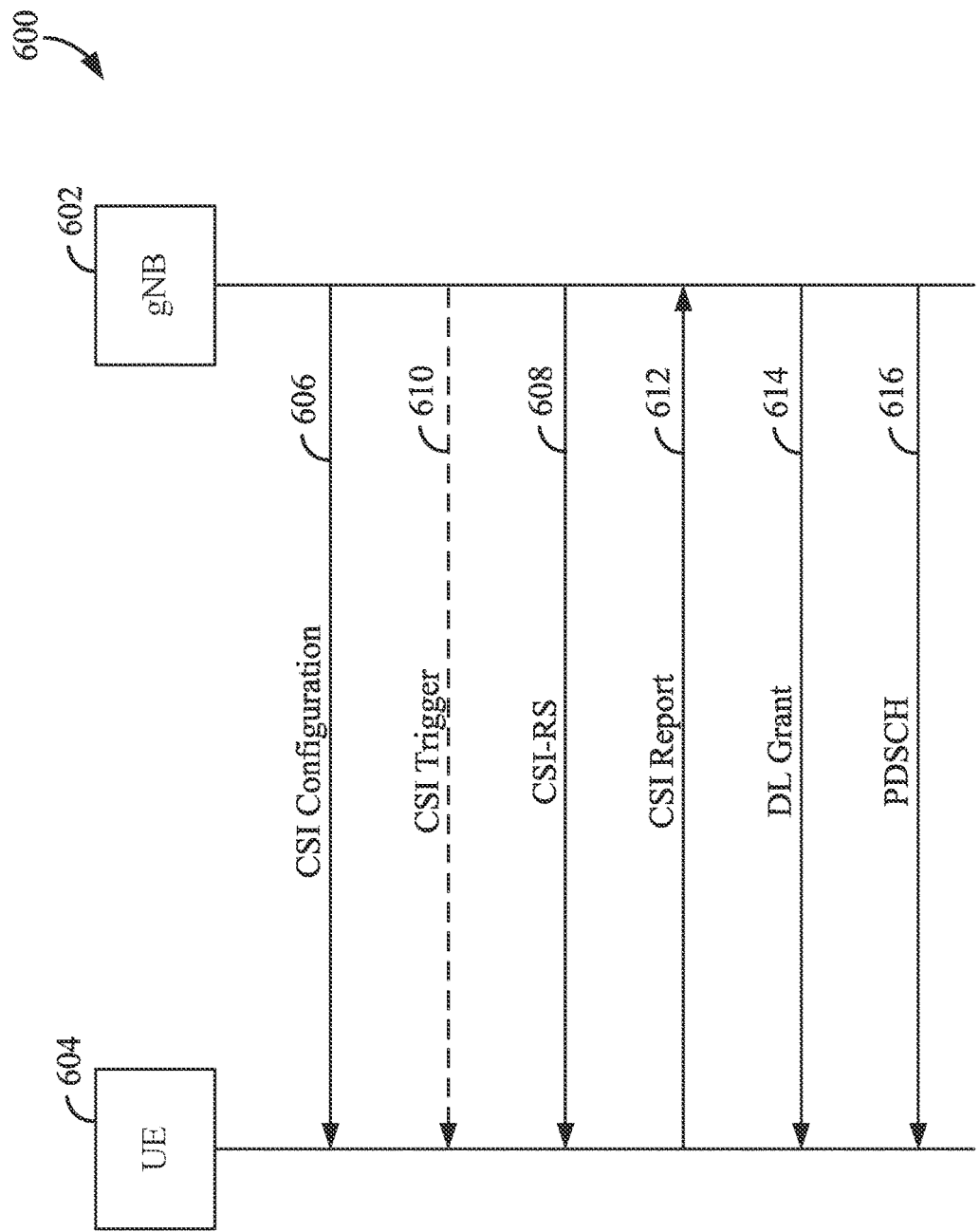
FIG. 6 is a diagram illustrating a procedure for configuring channel state information (CSI) reporting in wireless communication according to some aspects of the disclosure.

FIG. 6 is a diagram illustrating a CSI reporting procedure 600 in wireless communication according to some aspects. The procedure 600 can be performed by any of scheduling entities (e.g., a base station or gNB 602) and scheduled entities (e.g., UE 604) in FIGS. 1-2. The gNB 602 can transmit CSI configuration information 606 to the UE 604, for example, using RRC signaling, as described above. In one example, the gNB 602 can transmit the CSI configuration information 606 in a CSI-ReportConfig RRC message. The gNB 602 can use the CSI configuration information 606 to configure periodic, aperiodic, and/or semi-persistent CST reporting at the UE 604. The CSI configuration information 606 can also configure the information (e.g., L1-RSRP, CQI, PMI, RI, etc.) to be included in a CSI report. The CSI configuration information 606 can also configure the reference signal resources (e.g., CSI-RS or SSB) for CSI reporting.

After transmitting the CST configuration information 606, the gNB 602 can transmit an aperiodic, periodic, and/or semi-persistent reference signal (e.g., CSI-RS) 608 using the configured resources for CSI reporting. In case of aperiodic CSI reporting, the gNB 602 can transmit a CSI trigger 610 before transmitting the reference signal. In some examples, the CSI trigger 610 may be an UL grant that can trigger aperiodic CSI reporting. The UE 604 can measure the reference signal 608 (CSI-RS) and transmit a CSI report 612 in an uplink channel (e.g., PUCCH/PUSCH). Based on the CSI report 612, the gNB 602 can determine the channel and interference condition as measured by the UE. Then, the gNB 602 can determine various parameters for a DL transmission and transmit a DL grant 614. Some parameters of DL transmission are MCS, transmission rank, resource allocation, precoder, and/or power for the subsequent DL transmission. After the DL grant 614, the gNB 602 can transmit a DL transmission 616 (e.g., PDSCH) based on the DL grant 614 and determined parameters.

For effective CSI reporting, the channel condition and interference should not change significantly from the time of the CSI reporting to the DL transmission (e.g., PDSCH). In some cases, the communication channel may be subject to bursty interference due to bursty traffic, for example, ultra reliable low latency communications (URLLC). Such bursty interference can render the CSI report invalid or ineffective for scheduling a DL/UL transmission because the CSI report may no longer accurately represent the current channel condition and interference at the time of DLUL transmission. Therefore, the CSI report may be considered expired or aged.

Some aspects of the disclosure provide a CSI reporting procedure that can detect or determine the validity of a CSI report so that a scheduling entity (e.g., gNB) can avoid using an outdated or expired CSI report to make scheduling decisions for communications between the scheduling entity and a UE. A valid CSI report can reflect the current state or condition of the communication channel. In some aspects, the scheduling entity can configure the UE to include CSI correlation information or value (e.g., a CST correlation coefficient) in a CSI report. Based on the CSI correlation information, the scheduling entity can determine whether or not the CSI report is valid (i.e., not expired) or still reflecting the current channel/interference condition. In one example, the CSI correlation coefficient can have any value from 0 to 1. The highest correlation has a value of 1, and the lowest correlation has a value of 0. A CSI report with a high CSI correlation coefficient can indicate that the channel condition and interference have not changed significantly, and as such, the CSI report is valid. By contrast, a CSI report with a low CSI correlation coefficient can indicate that the channel condition and interference have changed significantly, and as such, the CSI report may be rendered invalid or expired. The scheduling entity can adjust the periodicity of the CSI report based on the validity of the CST report.

Figure 7:
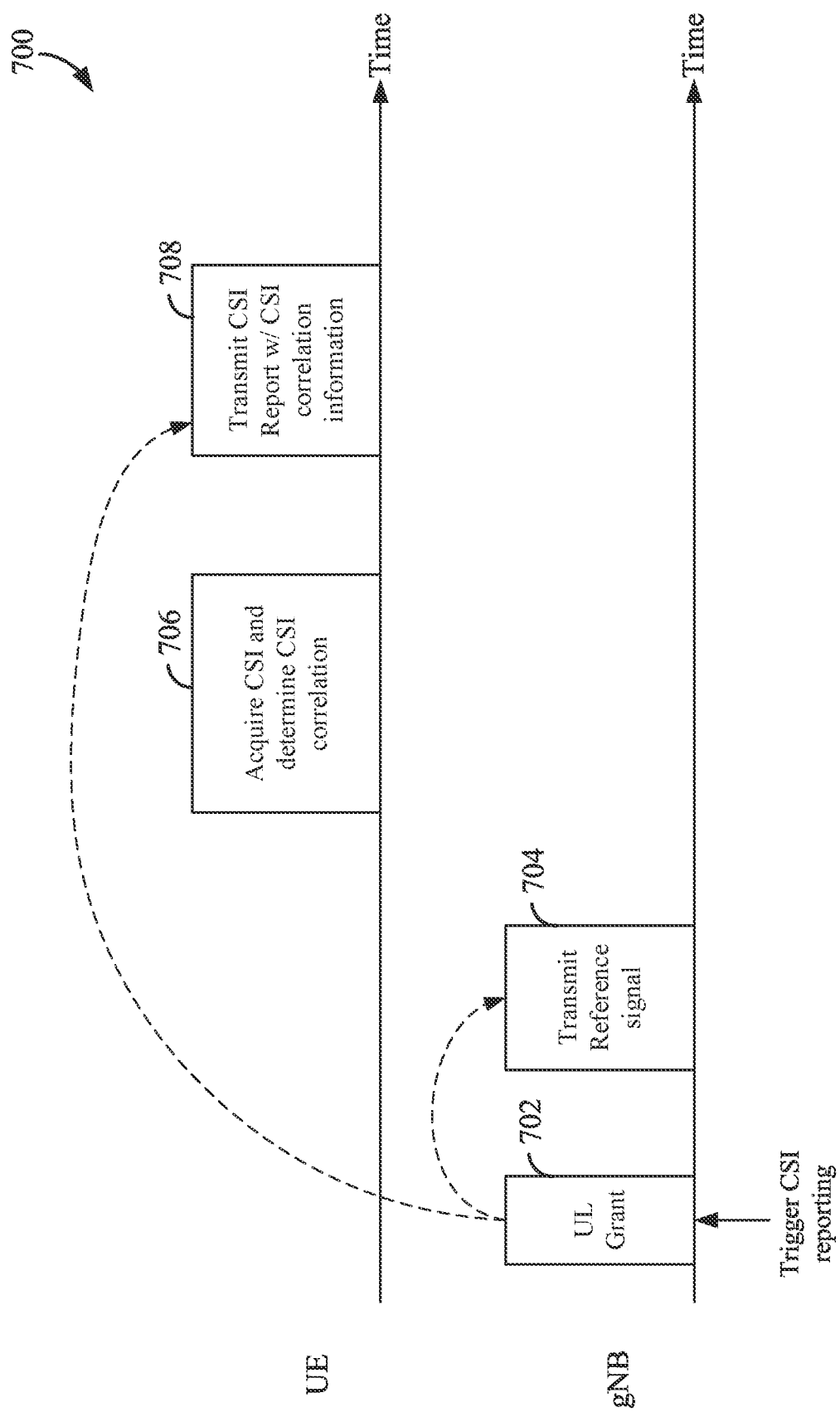
FIG. 7 is a diagram illustrating an exemplary CSI reporting procedure using CSI correlation information according to some aspects of the disclosure.

FIG. 7 is a diagram illustrating an exemplary CSI reporting procedure 700 using CSI correlation information according to some aspects of the disclosure. The CSI reporting procedure 700 can be performed by any of the scheduling entities (e.g., a gNB) and UEs of FIGS. 1, 2, and 6. In one example, a gNB can transmit an UL grant 702 to a UE to trigger CSI reporting (e.g., periodic, aperiodic, or semi-persistent CSI reporting) on a channel between the gNB and the UE. For example, the gNB can transmit the UL grant 702 in a DCI or MAC CE. The UL grant 702 can provide or indicate the CST measurement resources (e.g., CSI-RS resources 508) to be used for CSI measurement and reporting. After the UL grant 702, the gNB can transmit a reference signal 704 using the CSI measurement resources that can be used for measuring channel and/or interference. In one example, the gNB can transmit NZP CSI-RS or SSB that can be used for channel measurements. In one example, the gNB can transmit ZP CSI-RS that can be used for interference measurements.

At 706, the UE can measure the channel (e.g., channel and/or interference measurements) to acquire the CSI of the channel between the gNB and the UE. In some aspects, the UE can determine CSI correlation information based on the measurements of the reference signal (e.g., CSI-RS) and/or interference measurements. In some aspects, the CSI correlation information can include channel correlation information and/or interference correlation information. Then, the UE can transmit a CSI report 708, including the CSI and CSI correlation information.

Figure 8:
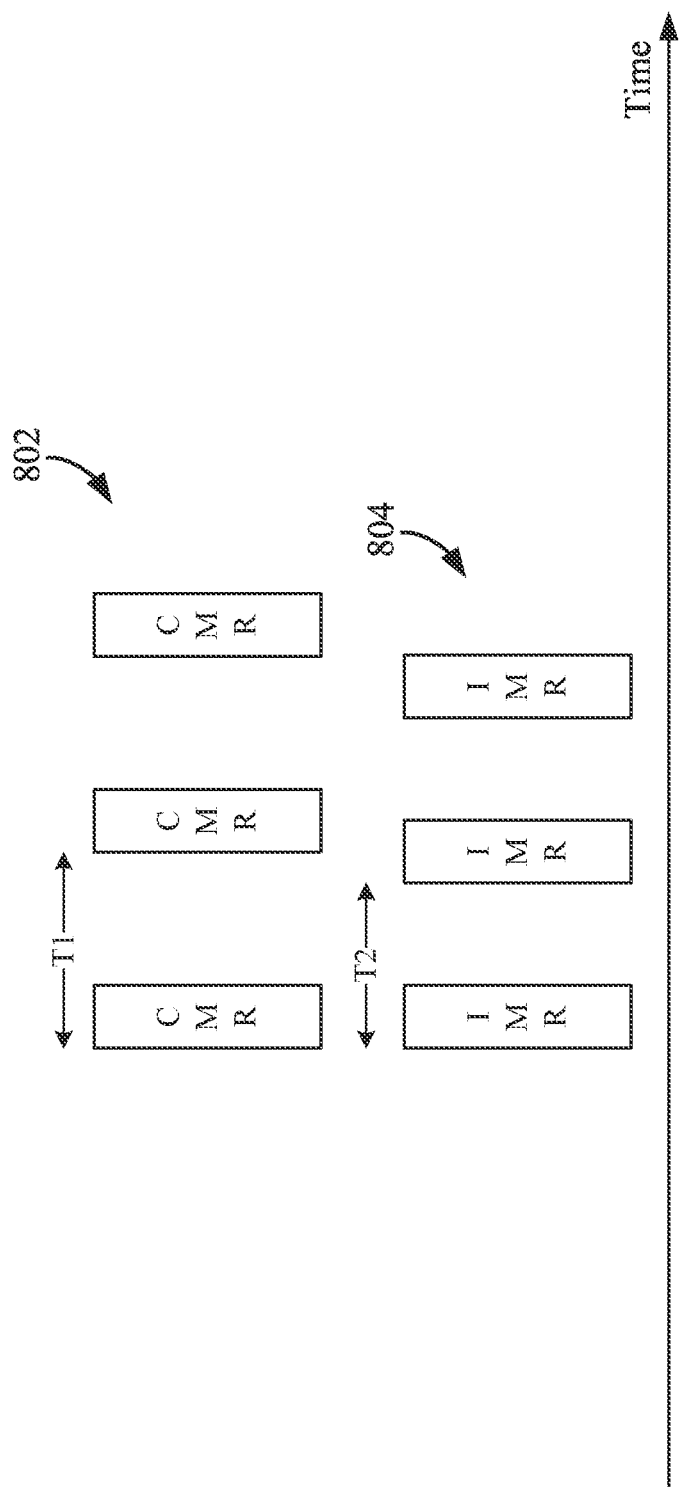
FIG. 8 is a diagram illustrating exemplary resources for channel measurement and interference measurement for determining CSI correlation according to some aspects of the disclosure.

FIG. 8 is a diagram conceptually illustrating exemplary channel measurement resources and interference measurement resources for determining CSI correlation information according to some aspects. In one example, the scheduling entity (e.g., gNB) can configure the UE to measure the communication channel based on a first set of measurement resources (e.g., RBs 308) associated with the reference signal (e.g., CSI-RS or SSB). For example, the first set of measurement resources may include a number of channel measurement resources (CMRs) 802 (e.g., NZP CSI-RS or SSB resources). The CMRs 802 may include a plurality of resources distributed (e.g., consecutive, back-to-back) in the time domain. The first set of measurement resources may have more or fewer number of resources than that are shown in FIG. 8. For example, the CMRs 802 may be specified in the UL grant 702. The UE can measure the channel for each channel measurement resource (CMR) 802.

In some aspects, the gNB can configure the UE to measure interference in the communication channel based on a second set of measurement resources. For example, the second set of measurement resources may be specified in the UL grant 702. The second set of measurement resources may include a number of interference measurement resources (IMRs) 804 (e.g., CSI-IM resources). The second set of measurement resources may have more or fewer number of resources than that are shown in FIG. 8. The IMRs 804 may include a plurality of resources distributed (e.g., consecutive, back-to-back) in the time domain. The UE can measure the interference of the communication channel between the UE and gNB using the IMRs 804. For example, the gNB can transmit ZP CSI-RS using the IMRs 804.

The CMRs/IMRs can repeat in the time domain according to their respective periodicities or patterns. The periodicities and durations of the CMRs/IMRs shown in FIG. 8 are illustrative examples, and the CMRs 802 and IMRs 804 may have other periodicities and/or patterns in other examples. For example, the CMRs 802 has a first periodicity (T1), and the IMRs has a second periodicity (T2). In one aspect, the first periodicity may be different from the second periodicity. In one example, the first periodicity may be longer than the second periodicity. In one example, the first periodicity may be shorter than the second periodicity. In another example, the first periodicity may be the same as the second periodicity. In one aspect, the CMRs 802 and IMRs 804 may be offset in time and have the same or different periodicities. In some aspects, the CMRs and IMRs may include the same or partially the same overlapping wireless resources or completely different wireless resources among the measurement resources for the communication channel. In general, a shorter CMRs/IMRs periodicity (e.g., T1/T2 in FIG. 8) enables the UE to determine channel correlation or interference correlation in a bursty channel because the UE can perform more frequent channel/interference measurements on the CMRs/IMRs.

In some aspects, the UE can calculate a channel correlation coefficient (CCC) using equation (1).

$$\text{Channel correlation coefficient} = \frac{\sum_{i=1}^{N-1}(h_i - \bar{h}) * conj(h_{i+1} - \bar{h})}{\sqrt{\left(\sum_{i=1}^{N-1}(h_i - \bar{h})^2\right) * \left(\sum_{i=1}^{N-1}(h_{i+1} - \bar{h})^2\right)}} \quad (1)$$

$$\bar{h} = \sum_{i=1}^{N} h_i$$

In equation (1), $h_i$ (e.g., $h_1$, $h_2$, h2, ... $h_n$) are channel measurements based on N CMRs, respectively (N is an integer with a value of 1 or more). The channel correlation coefficient can have any value from 0 to 1. The highest correlation may have a value of 1, and the lowest correlation may have a value of 0.

In some aspects, the UE can calculate an interference correlation coefficient (ICC) using equation (2).

$$\text{Interference correlation coefficient} = \frac{\sum_{i=1}^{N-1}(f_i - \bar{f}) * conj(f_{i+1} - \bar{f})}{\sqrt{\left(\sum_{i=1}^{N-1}(f_i - \bar{f})^2\right) * \left(\sum_{i=1}^{N-1}(f_{i+1} - \bar{f})^2\right)}} \quad (2)$$

$$\bar{f} = \sum_{i=1}^{N} f_i$$

In equation (2), $f_i$ (e.g., $f_1$, $f_2$, $f_3$, ... $f_n$) are interference measurements based on N IMRs respectively. The interference correlation coefficient can have any value from 0 to 1. The highest correlation has a value of 1, and the lowest correlation has a value of 0.

The UE can determine a CSI correlation coefficient based on the CCC and ICC, for example, using equation (3) or any suitable methods.

$$\text{CSI CC} = \min(\text{channel CC}, \text{Interference CC}) \quad (3)$$

In equation (3), CSI CC can be determined as being equal to the CCC or ICC, whichever has the smaller value. In some aspects, the UE can include both CCC and ICC in the CSI report (e.g., CSI report 708) with or without the corresponding CSI CC. The gNB can determine the CSI CC based on the CCC and the ICC using a predetermined rule (e.g., equation (3)). In some aspects, the gNB can configure CMRs without IMRs, and the UE can include only the CCC in the CSI report. In some aspects, the gNB can configure IMRs without CMRs, and the UE can include only the ICC in the CSI report. In some aspects, the gNB can configure CMRs and IMRs on the same or different resources (e.g., time, frequency, and spatial resources), and the UE can include both the CCC and the ICC in the CSI report. In some aspects, the UE can include CSI CC in the CSI report without including the CCC and ICC.

Figure 9:
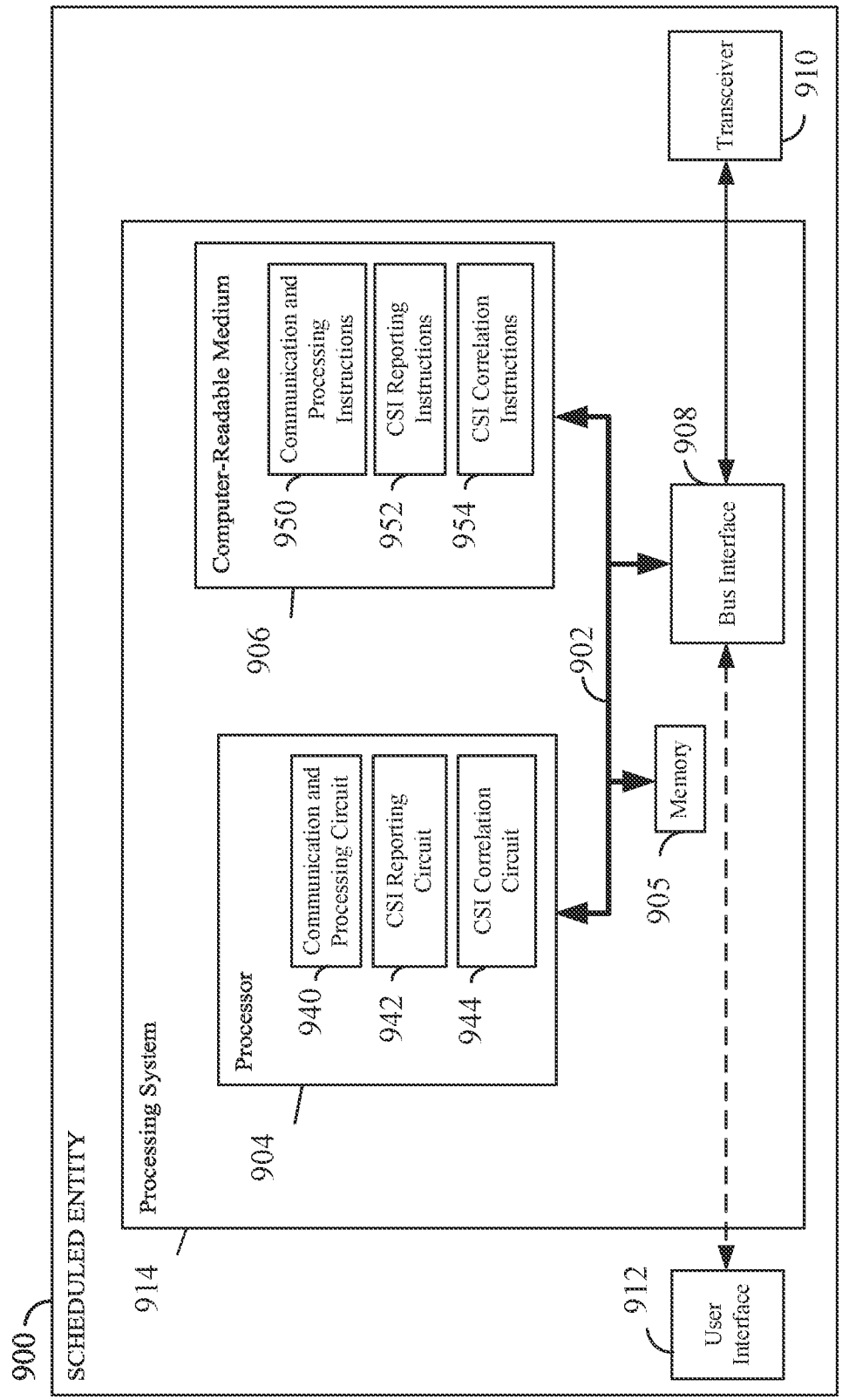
FIG. 9 is a block diagram illustrating an example of a hardware implementation for a scheduled entity according to some aspects of the disclosure.

FIG. 9 is a block diagram illustrating an example of a hardware implementation for a scheduled entity 900 employing a processing system 914. For example, the scheduled entity 900 may be a scheduled entity (e.g., UE) as illustrated in any one or more of FIGS. 1, 2, 4, 6, and 7.

The scheduled entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 900 may be configured to perform any one or more of the functions and procedures described herein. That is, the processor 904, as utilized in a scheduled entity 900, may be used to implement any one or more of the processes and procedures described and illustrated in FIGS. 6-8, 10, and 11.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 connected with one or more antennas. The transceiver 910 and the antennas provide a communication interface or means for communicating with various other apparatus over a transmission medium. Depending upon the nature of the apparatus, a user interface 912 (e.g., keypad, display, speaker, microphone, joystick, touchscreen, etc.) may also be provided. Of course, such a user interface 912 is optional, and may be omitted in some examples, such as a base station.

The processor 904 is responsible for managing the bus 902 and general processing, including the execution of software or code stored on a computer-readable medium 906. The software, when executed by the processor 904, causes the processing system 914 to perform the various functions described herein for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions, including, for example, channel information system (CSI) measurement and reporting in wireless communication. For example, the circuitry may be configured to implement one or more of the functions described in relation to FIGS. 6-8, 10, and 11.

In some aspects of the disclosure, the processor 904 may include communication and processing circuitry 940 configured for various functions, including, for example, communicating (e.g., transmitting and receiving signals and/or data) with a scheduling entity (e.g., base station, gNB), other scheduled entities (e.g., UE), or any other entity. In some examples, the communication and processing circuitry 940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 940 may include one or more transmit/receive chains.

In some implementations where the communication involves receiving information, the communication and processing circuitry 940 may obtain information from a component of the wireless communication device 900 (e.g., from the transceiver 910 that receives the information via radio frequency signaling or some other type of signaling suitable for the applicable communication medium), process (e.g., decode) the information, and output the processed information. For example, the communication and processing circuitry 940 may output the information to another component of the processor 904, to the memory 905, or to the bus interface 908. In some examples, the communication and processing circuitry 940 may receive one or more of signals, messages, other information, or any combination thereof. In some examples, the communication and processing circuitry 940 may receive information via one or more channels. In some examples, the communication and processing circuitry 940 may include functionality for a means for receiving. In some examples, the communication and processing circuitry 940 may include functionality for a means for processing, including a means for demodulating, a means for decoding, etc.

In some implementations where the communication involves sending (e.g., transmitting) information, the communication and processing circuitry 940 may obtain information (e.g., from another component of the processor 904, the memory 905, or the bus interface 908), process (e.g., modulate, encode, etc.) the information, and output the processed information. For example, the communication and processing circuitry 940 may output the information to the transceiver 910 (e.g., that transmits the information via radio frequency signaling or some other type of signaling suitable for the applicable communication medium). In some examples, the communication and processing circuitry 940 may send one or more of signals, messages, other information, or any combination thereof. In some examples, the communication and processing circuitry 940 may send information via one or more channels. In some examples, the communication and processing circuitry 940 may include functionality for a means for sending (e.g., a means for transmitting). In some examples, the communication and processing circuitry 940 may include functionality for a means for generating, including a means for modulating, a means for encoding, etc.

In addition, the communication and processing circuitry 940 may be configured to process and transmit uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 940 may further be configured to execute communication and processing software 950 stored on the computer-readable medium 906 to implement one or more functions described herein.

In some aspects of the disclosure, the processor 904 may include CSI reporting circuitry 942 configured for various functions including CSI measurement and reporting functions described herein. For example, the CSI reporting circuitry 942 can be configured to measure or determine the CSI (e.g., CQI, PMI, SLI, and/or RI) of a communication channel between the scheduled entity and the network (e.g., gNB). In some examples, the CSI reporting circuitry 942 may include one or more hardware components that provide the physical structure that performs processes related to CSI measurement and reporting described herein. In some aspects, the CSI reporting circuitry 942 can be configured to acquire the channel measurements and interference measurements of a channel between the scheduled entity 900 and a scheduling entity (e.g., gNB) and determine the CSI based on the channel measurements and/or interference measurements. The CSI reporting circuitry 942 may further be configured to execute CSI reporting software 952 stored on the computer-readable medium 906 to implement one or more functions described herein.

In some aspects of the disclosure, the processor 904 may include CSI correlation circuitry 944 configured for various functions including CSI correlation information determination and processing described herein. In some examples, the CSI correlation circuitry 944 may include one or more hardware components that provide the physical structure that performs processes related to CSI correlation information determination and processing described herein. The CSI correlation circuitry 944 can be configured to determine the CSI correlation information based on a channel correlation coefficient and/or an interference correlation coefficient. The CSI correlation circuitry 944 can be configured to determine the channel correlation coefficient and/or the interference correlation coefficient, using a plurality of periodic resources (e.g., CMRs 802 and/or IMRs 804 shown in FIG. 8) indicated in the CSI reference signal information. For example, the CSI correlation circuitry 944 can be configured to determine the channel correlation coefficient using a first set of resources (e.g., CMRs 802), and determine the interference correlation coefficient using a second set of resources (e.g., IMRs 804). The CSI correlation circuitry 944 can be configured to determine the channel correlation coefficient based on a plurality of measurements of a reference signal (e.g., CSI-RS. SSB), each measurement corresponding to one of the plurality of periodic resources. The CSI correlation circuitry 944 can be configured to determine the interference correlation coefficient based on a plurality of interference measurements, each interference measurement corresponding to one of the plurality of periodic resources (e.g., CSI-IM). The CSI correlation circuitry 944 can be configured to determine the CSI correlation information (e.g., CSI correlation coefficient) based on a comparison between the channel correlation coefficient and the interference correlation coefficient, for example, using equation (3) described above. The CSI correlation circuitry 944 may further be configured to execute CSI correlation software 954 stored on the computer-readable medium 906 to implement one or more functions described herein.

Figure 10:
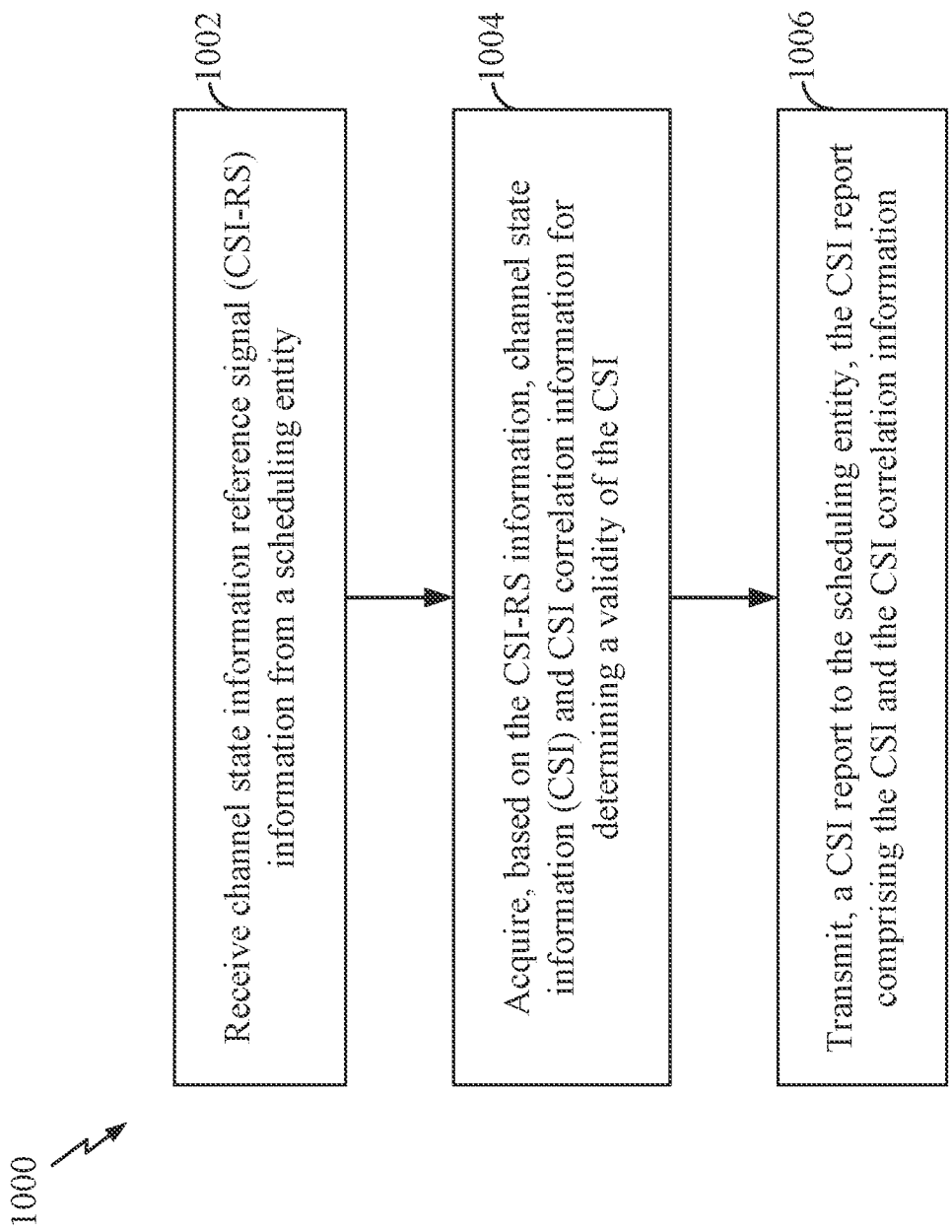
FIG. 10 is a flow chart illustrating an exemplary process for wireless communication at a UE using CSI correlation information for validating CSI according to some aspects of the disclosure.

FIG. 10 is a flow chart illustrating an exemplary process 1000 for wireless communication using channel state information (CSI) and CSI correlation information according to some aspects of the disclosure. As described below, some or all illustrated features may be omitted in a particular implementation within the scope of the present disclosure, and some illustrated features may not be required for all implementations. In some examples, the process 1000 may be carried out by the scheduled entity 900 illustrated in FIG. 9. In some examples, the process 1000 may be carried out by any suitable apparatus or means for carrying out the functions or algorithm described below.

At block 1002, the scheduled entity (e.g., a UE) can receive channel state information reference signal (CSI-RS) information from a scheduling entity. In one aspect, the communication and processing circuitry 940 can provide a means to receive the CSI-RS information via the transceiver 910. In some aspects, the CSI-RS information (e.g., CSI configuration 606) may indicate communication resources (e.g., CSI-RS, SSB, CSI-IM) for channel measurements and/or interference measurements. In one example, the communication resources may include resources (e.g., CMRs) for a DL reference signal (e.g., CSI-RS, SSB, etc.). In one example, the communication resources may include resources (e.g., IMRs) for interference measurements.

At block 1004, the scheduled entity can acquire, based on the CSI-RS information, channel state information (CSI) and CSI correlation information for determining the validity of the CSI. In one aspect, the CSI reporting circuitry 942 can provide a means to acquire the CSI and CSI correlation information. For example, the scheduled entity can measure a reference signal on CMRs and/or channel interference on IMRs as described above in relation to FIGS. 7-8. Then, the scheduled entity can determine channel correlation information based on the reference signal measurements and/or interference correlation information based on the interference measurements. For example, the channel correlation information can include a channel correlation coefficient (CCC) that can be determined using equation (1) above. For example, the interference correlation information can include an interference correlation coefficient (ICC) that can be determined using equation (2) above. In some aspects, the scheduled entity can determine the CSI correlation information (e.g., CSI correlation coefficient) based on the channel correlation information and/or interference correlation information using equation (3) above.

At block 1006, the scheduled entity can transmit a CSI report to the scheduling entity. The CSI report includes the CSI and the CSI correlation information that are acquired based on communication resources (e.g., CMRs and IMRs) indicated by the CSI-RS information. In one aspect, the communication and processing circuitry 940 can provide a means to transmit the CSI report via the transceiver 910. In some aspects, the CSI correlation information can include the channel correlation information (e.g., CCC) and/or the interference correlation information (e.g., ICC). The scheduling entity can determine the CSI correlation information (e.g., CSI correlation coefficient) based on the channel correlation information and/or the interference correlation information using equation (3).

Figure 11:
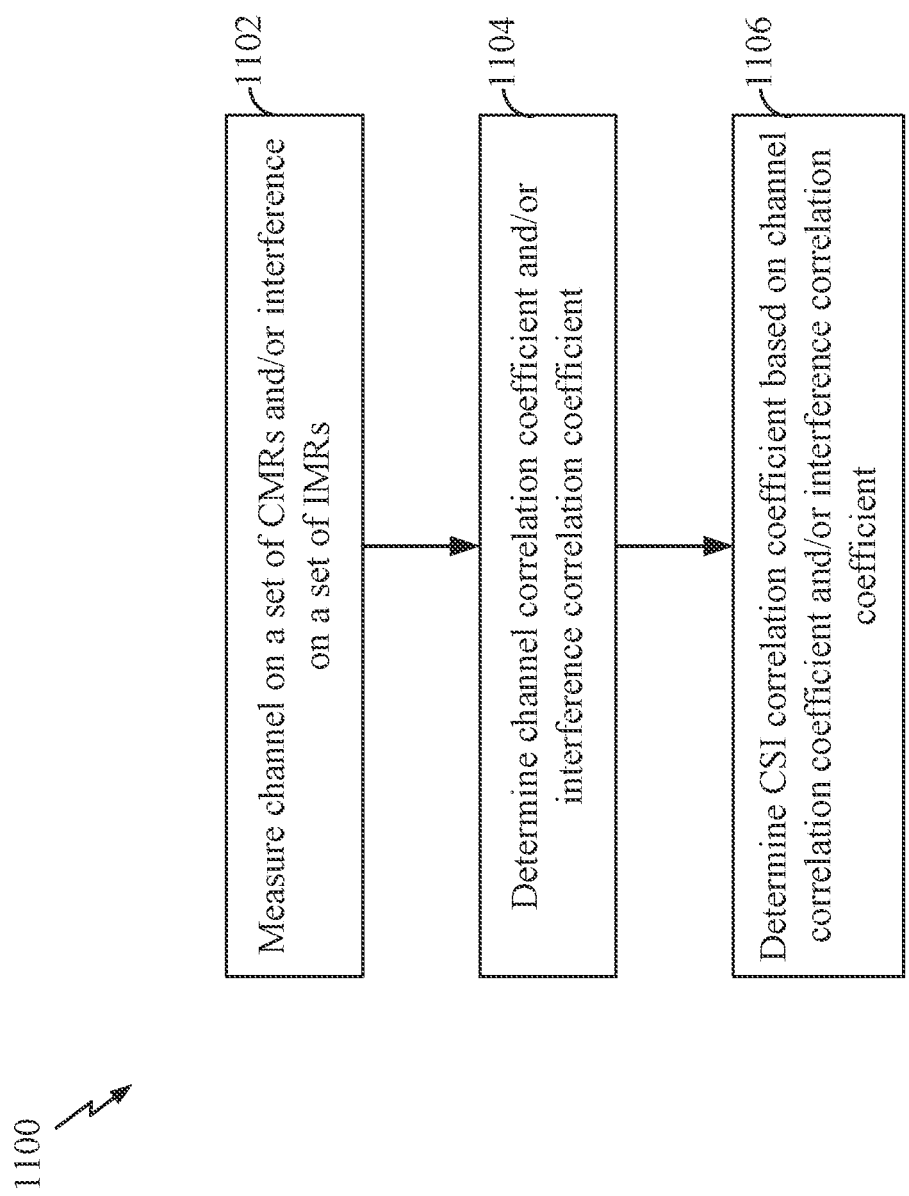
FIG. 11 is a flow chart illustrating an exemplary process for determining CSI correlation information according to some aspects of the disclosure.

FIG. 11 is a flow chart illustrating an exemplary process 1100 for determining CSI correlation information according to some aspects of the disclosure. As described below, some or all illustrated features may be omitted in a particular implementation within the scope of the present disclosure, and some illustrated features may not be required for all implementations. In some examples, the process 1100 may be carried out by the scheduled entity 900 illustrated in FIG. 9. In some examples, the process 1100 may be carried out by any suitable apparatus or means for carrying out the functions or algorithm described below.

At block 1102, the scheduled entity can measure the communication channel on a set of CMRs and/or interference on a set of IMRs. In some aspects, the set of CMRs may be the same as the CMRs described above in FIG. 8, and the set of IMRs may be the same as the IMRs described above in FIG. 8. In some aspects. The CMRs and IMRs may have the same periodicity or different periodicities. In one aspect, the CSI reporting circuitry 942 can provide a means to measure the communication channel on CMRs and measure the channel interference on IMRs. For example, the scheduled entity can perform multiple time-distributed channel measurements, each measurement corresponding to one of the CMRs, and perform multiple time-distributed interference measurements, each measurement corresponding to one of the IMRs.

At block 1104, the scheduled entity can determine a channel correlation coefficient and/or an interference correlation coefficient. In one aspect, the CSI correlation circuitry 944 can provide a means to determine the channel correlation coefficient and/or the interference correlation coefficient. In one example, the scheduled entity can determine the channel correlation coefficient using equation (1) based on channel measurements on CMRs (e.g., CSI-RS), and determine the interference correlation coefficient using equation (2) based on interference measurements on IMRs (e.g., CSI-IM).

At block 1106, the scheduled entity can determine a CSI correlation coefficient based on the channel correlation coefficient and/or the interference correlation coefficient. In one aspect, the CSI correlation circuitry 944 can provide a means to determine the CSI correlation coefficient. In some aspects, the scheduled entity can determine the CSI correlation coefficient based on the channel correlation coefficient and the interference correlation coefficient, for example, using equation (3). The scheduled entity can send the CSI correlation coefficient to the scheduling entity as part of the CSI correlation information in the CSI report.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 4, and/or 6, and utilizing, for example, the processes and/or algorithms described herein in relation to FIGS. 6-8, 10, and/or 11.

Figure 12:
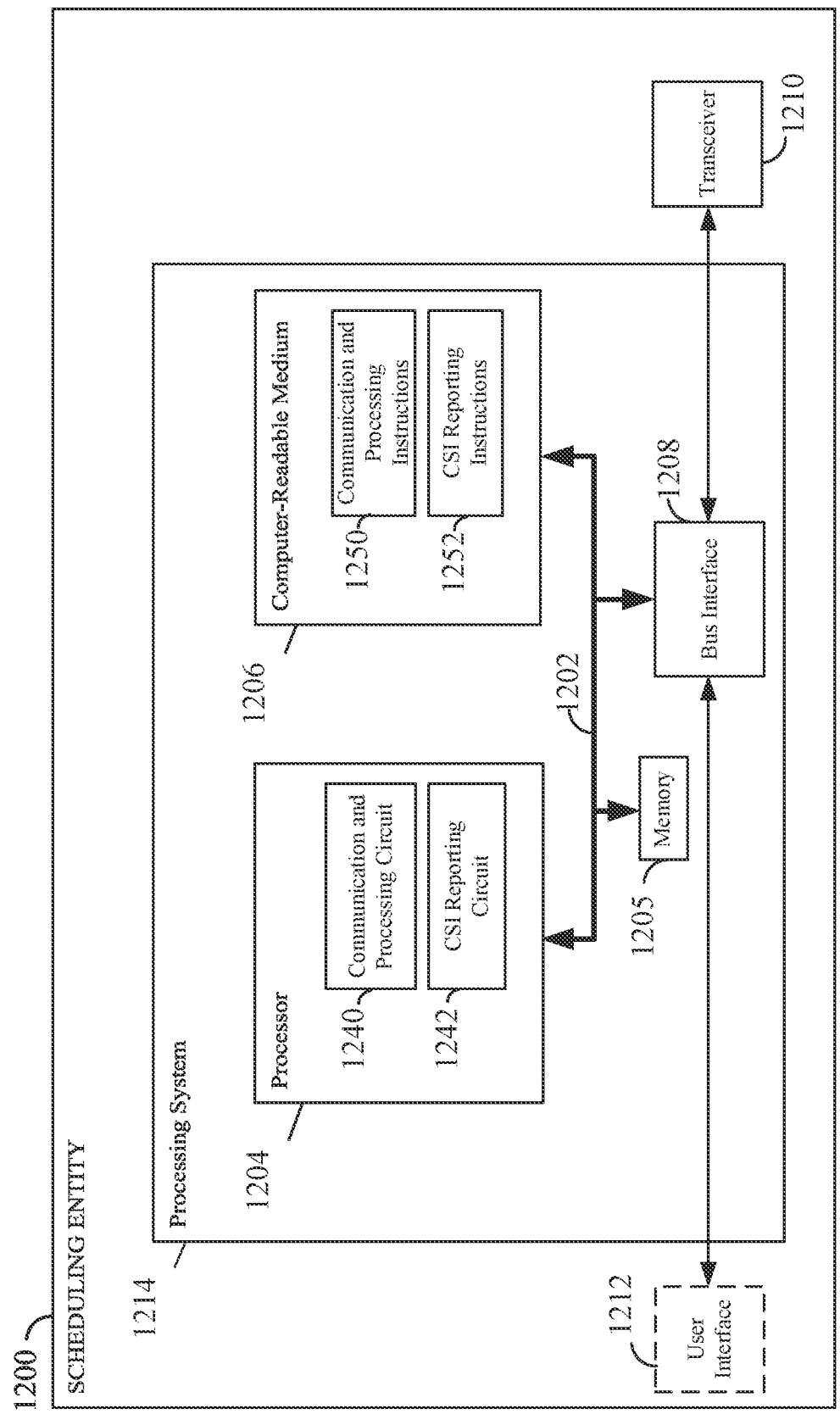
FIG. 12 is a block diagram illustrating an example of a hardware implementation for a scheduling entity according to some aspects of the disclosure.

FIG. 12 is a conceptual diagram illustrating an example of a hardware implementation for an exemplary scheduling entity 1200 employing a processing system 1214. In accordance with various aspects of the disclosure, an element, or any portion of an element, or any combination of elements may be implemented with a processing system 1214 that includes one or more processors 1204. For example, the scheduling entity 1200 may be a scheduling entity or gNB as illustrated in any one or more of FIGS. 1, 2, 6, and 7.

The processing system 1214 may be substantially the same as the processing system 914 illustrated in FIG. 9, including a bus interface 1208, a bus 1202, memory 1205, a processor 1204, and a computer-readable medium 1206 stored with executable code. Furthermore, the scheduling entity 1200 may include an optional user interface 1212 and a transceiver 1210 substantially similar to those described above in FIG. 9. That is, the processor 1204, as utilized in a scheduling entity 1200, may be used to implement any one or more of the processes described and illustrated in FIGS. 6-8, 13, and 14.

In some aspects of the disclosure, the processor 1204 may include circuitry configured for various functions, including, for example, wireless communication using channel state information (CSI) and CSI correlation information for determining the validity of the CSI. For example, the circuitry may be configured to implement one or more of the functions described in relation to FIGS. 6-8, 13, and 14.

In some aspects of the disclosure, the processor 1204 may include communication and processing circuitry 1240 configured for various functions, including, for example, communicating with network entities, scheduled entities, or any other entity, such as, for example, local infrastructure or an entity communicating with the scheduling entity 1200. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1240 may be configured to receive and process uplink traffic and uplink control messages (e.g., similar to uplink traffic 116 and uplink control 118 of FIG. 1), process and transmit downlink traffic and downlink control messages (e.g., similar to downlink traffic 112 and downlink control 114). The communication and processing circuitry 1240 may further be configured to execute communication and processing software 1250 stored on the computer-readable medium 1206 to implement one or more functions described herein.

In some aspects of the disclosure, the processor 1204 may include CSI reporting circuitry 1242 configured for various functions, for example, CSI configuration, processing, and reporting described herein. In some examples, the CSI reporting circuitry 1242 may include one or more hardware components that provide the physical structure that performs processes related to CSI configuration, processing, and reporting described herein. In some aspects, the CSI reporting circuitry 1242 can configure resources for CSI measurements, reporting, and CSI correlation determination. In some aspects, the CSI reporting circuitry 1242 can modify CSI configuration based on CSI correlation information reported from the UE. The CSI reporting circuitry 1242 may further be configured to execute CSI reporting software 1252 stored on the computer-readable medium 1206 to implement one or more functions described herein.

Figure 13:
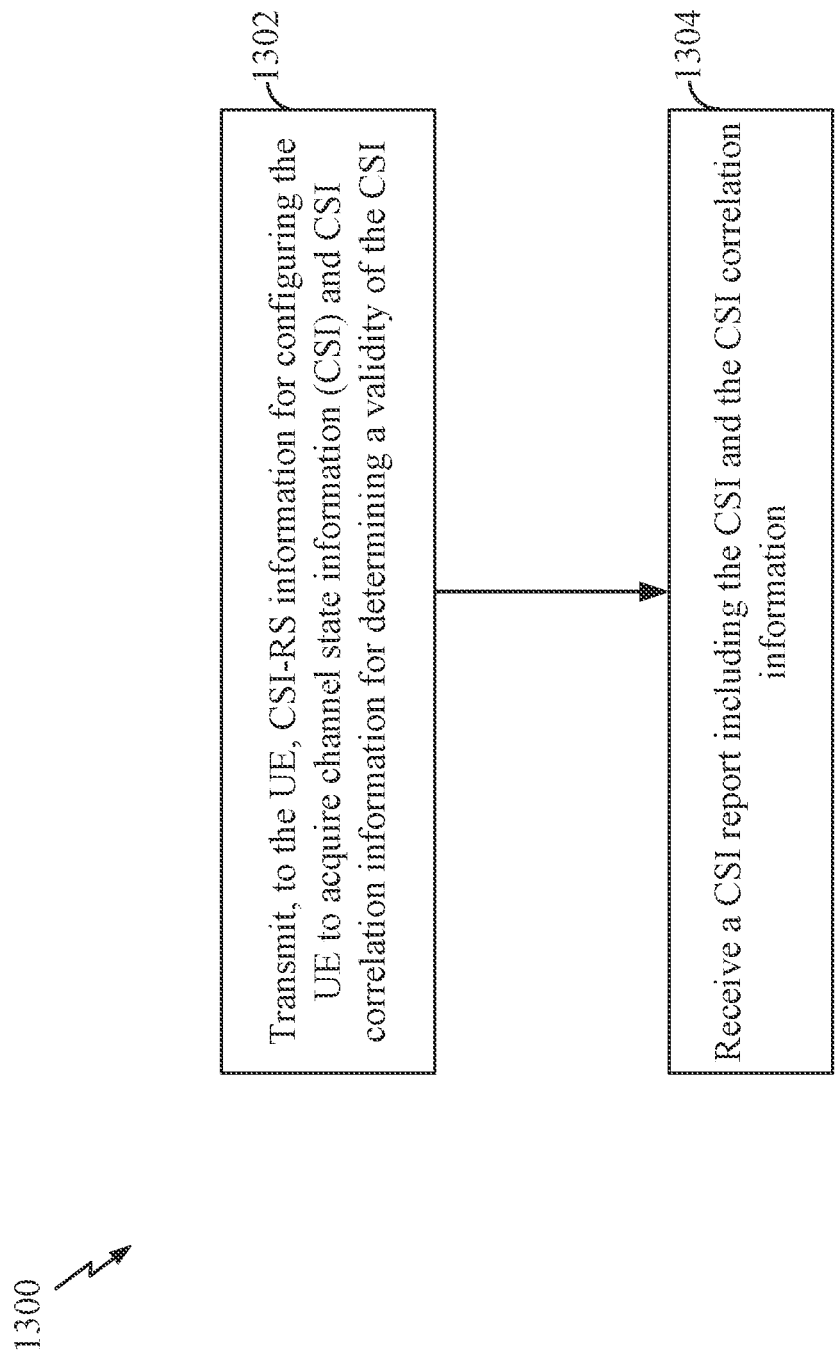
FIG. 13 is a flow chart illustrating an exemplary process for wireless communication at a scheduling entity using CSI correlation information for validating CSI according to some aspects of the present disclosure.

FIG. 13 is a flow chart illustrating an exemplary process 1300 for wireless communication using CSI correlation information at a scheduling entity according to some aspects of the disclosure. As described below, some or all illustrated features may be omitted in a particular implementation within the scope of the present disclosure, and some illustrated features may not be required for all implementations. In some examples, the process 1300 may be carried out by the scheduling entity 1200 illustrated in FIG. 12. In some examples, the process 1300 may be carried out by any suitable apparatus or means for carrying out the functions or algorithm described below.

At block 1302, the scheduling entity (e.g., gNB) can transmit channel state information reference signal (CSI-RS) information to a UE for configuring the UE to acquire channel state information (CSI) and CSI correlation information for determining the validity of the CSI. In one aspect, the communication and processing circuitry 1240 can provide a means for transmitting the CSI-RS information via the transceiver 1210 in a DL transmission. For example, the CSI-RS information may indicate and configure reference signal resources (e.g., CSI-RS, SSB, and/or CSI-IM) for channel and/or interference measurements. In one aspect, the CSI reporting circuitry 1242 can provide a means for determining and scheduling the resources for acquiring the CSI and CSI correlation information.

In some aspects, the scheduling entity can transmit a reference signal using resources according to the CSI-RS information. In one aspect, the communication and processing circuitry 1240 can provide a means for transmitting the reference signal, for example, using CSI-RS/SSB resources or CSI-IM resources. In some examples, the scheduling entity can configure a first set (e.g., CMRs 802) of the resources for measuring a channel and a second set (e.g., IMRs 804) of the resources for measuring interference of the channel. In some examples, the scheduling entity can configure a same set of resources for measuring a channel and interference of the channel. In that case, the same set of resources can include both CMRs and IMRs.

At block 1304, the scheduling entity can receive a CSI report including the CSI of the channel and the CSI correlation information. In one aspect, the communication and processing circuitry 1240 can provide a means for receiving the CSI report via the transceiver 1210. For example, the scheduling entity can receive the CSI report in an uplink channel (e.g., PUSCH). In some examples, the CSI correlation information may include a CSI correlation coefficient, a channel correlation coefficient, and/or an interference correlation coefficient. Based on the CSI correlation information, the scheduling entity can determine whether or not the CSI report is still valid and can reflect the current or up-to-date channel and interference condition.

Figure 14:
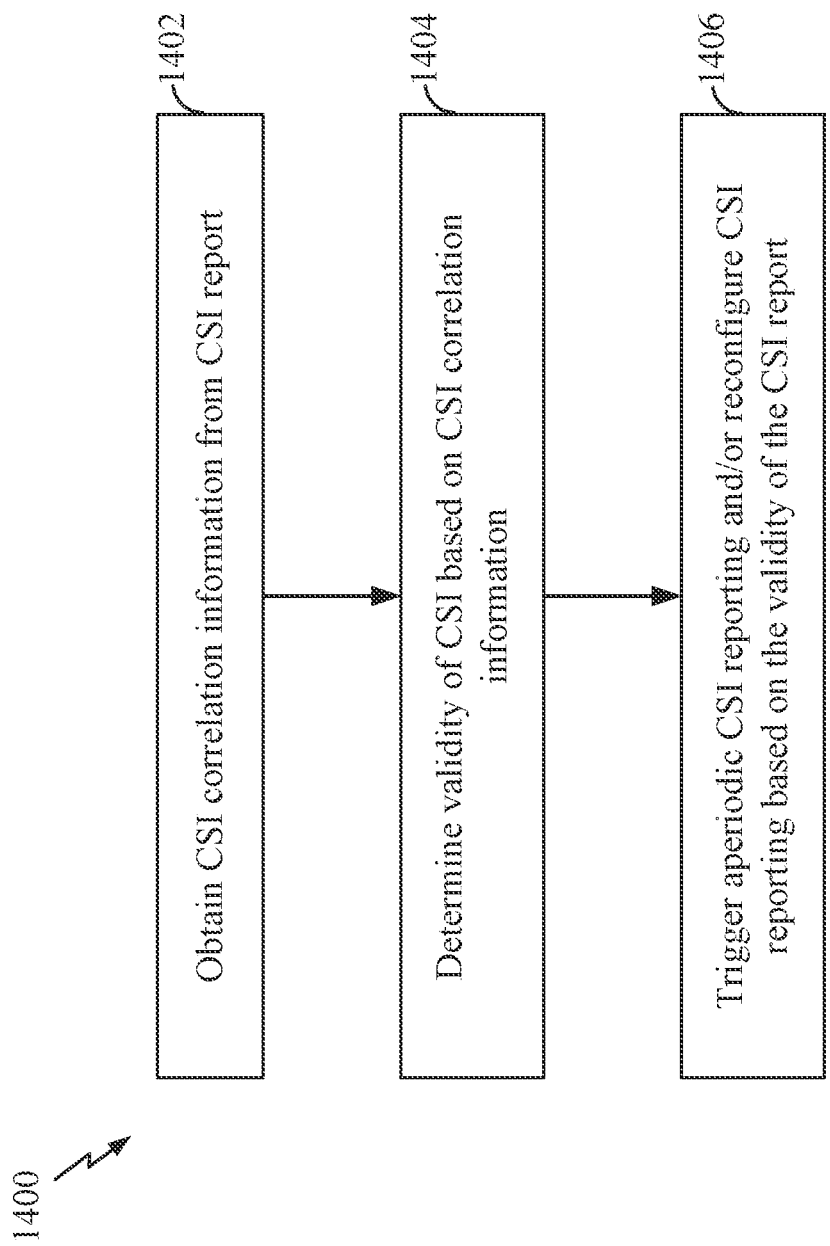
FIG. 14 is a flow chart illustrating an exemplary CSI reporting process using CSI correlation information according to some aspects of the present disclosure.

FIG. 14 is a flow chart illustrating an exemplary CSI reporting process 1400 using CSI correlation information according to some aspects of the disclosure. As described below, some or all illustrated features may be omitted in a particular implementation within the scope of the present disclosure, and some illustrated features may not be required for all implementations. In some examples, the process 1400 may be carried out by the scheduling entity 1200 illustrated in FIG. 12. In some examples, the process 1400 may be carried out by any suitable apparatus (e.g., gNB) or means for carrying out the functions or algorithm described below.

At block 1402, a scheduling entity can obtain CSI correlation information from a CSI report (e.g., CSI report 708) received from a UE. In one aspect, the CSI reporting circuitry 1242 can provide a means for processing the CSI report to obtain the CSI correlation information. In one example, the CSI report can include a CST correlation coefficient that can have any value from 0 (lowest correlation) to 1 (highest correlation). In one example, the CSI report can include a channel correlation coefficient (CCC) and/or an interference correlation coefficient (ICC). Each of these coefficients can have a value from 0 to 1. The scheduling entity can determine the CST correlation coefficient based on the CCC and/or the ICC, for example, using equation (3).

At block 1404, the scheduling entity can determine the validity of the CSI based on the CSI correlation information. In one aspect, the CST reporting circuitry 1242 can provide a means for determining the validity of the reported CST. In one example, the scheduling entity can determine that the reported CSI is valid if the CSI correlation coefficient, the CCC, and/or the ICC is/are greater than a predetermined threshold value. In one example, the scheduling entity can determine that the CSI is invalid if one or more of the CSI correlation coefficient, the CCC, and the ICC is/are smaller than the predetermined threshold value (e.g., 0.5 or smaller).

At block 1406, the scheduling entity can trigger aperiodic CSI reporting and/or reconfigure CSI reporting (e.g., periodic or semi-persistent CSI reporting) based on the validity of the CSI report. In one aspect, the CSI reporting circuitry 1242 can provide a means for triggering aperiodic CSI reporting and/or reconfiguring CSI reporting. In one aspect, the scheduling entity can trigger a new aperiodic CST report by scheduling an UL grant to obtain more recent or up-to-date CSI when the received CSI report is deemed invalid or expired based on the CSI correlation information. In one aspect, the scheduling entity can adjust (e.g., shorten) the periodicity of periodic/semi-persistent CSI feedback to obtain more frequent CSI reports when the CSI report is invalid or expired.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 2, 4, and/or 6, and utilizing, for example, the processes and/or algorithms described herein in relation to FIGS. 6-8, 13, and/or 14.

Several aspects of a wireless communication network have been presented with reference to an exemplary implementation. As those skilled in the art will readily appreciate, various aspects described throughout this disclosure may be extended to other telecommunication systems, network architectures and communication standards.

In a first aspect, a user equipment (UE) for wireless communication is provided. The UE includes a transceiver for wireless communication, a memory, and a processor coupled to the transceiver and the memory. The processor and the memory are configured to: receive, using the transceiver, a reference signal from a scheduling entity; acquire, based on the reference signal, channel state information (CSI) and CSI correlation information for determining a validity of a CSI report; and transmit, using the transceiver, the CSI report to the scheduling entity, the CSI report comprising the CSI and the CSI correlation information.

In a second aspect, alone or in combination with the first aspect, wherein the processor and the memory are further configured to determine the CSI correlation information based on at least one of a channel correlation coefficient or an interference correlation coefficient.

In a third aspect, alone or in combination with the second aspect, wherein the processor and the memory are further configured to: determine the channel correlation coefficient based on a first set of resources for receiving the reference signal; and determine the interference correlation coefficient based on a second set of resources for receiving the reference signal.

In a fourth aspect, alone or in combination with the third aspect, wherein the first set of resources has a first periodicity, and the second set of resources has a second periodicity that is different from the first periodicity.

In a fifth aspect, alone or in combination with any of the second to fourth aspects, wherein the processor and the memory are further configured to determine the channel correlation coefficient and the interference correlation coefficient based on a third set of resources for receiving the reference signal.

In a sixth aspect, alone or in combination with any of the second to fourth aspects, wherein the processor and the memory are further configured to determine the CSI correlation information based on a minimum of the channel correlation coefficient and the interference correlation coefficient.

In a seventh aspect, alone or in combination with any of the second to fourth aspects, wherein the processor and the memory are further configured to determine the CSI correlation information based on one of the channel correlation coefficient and the interference correlation coefficient.

In an eighth aspect, alone or in combination with the first aspect, wherein the CSI report includes at least one of a channel correlation coefficient or an interference correlation coefficient, for determining a CSI correlation coefficient.

In a ninth aspect, a scheduling entity for wireless communication is provides. The scheduling entity includes a transceiver for wireless communication with a user equipment (UE), a memory, and a processor coupled to the transceiver and the memory. The processor and the memory are configured to: transmit, to the UE, reference signal information for configuring the UE to acquire channel state information (CSI) and CSI correlation information for determining a validity of a CSI report; transmit a reference signal using resources according to the reference signal information: and receive the CSI report including the CSI and the CSI correlation information.

In a tenth aspect, alone or in combination with the ninth aspect, wherein the processor and the memory are further configured to determine a validity of the CSI report based on the CSI correlation information.

In an eleventh aspect, alone or in combination with the tenth aspect, wherein the processor and the memory are further configured to trigger an aperiodic CSI report from the UE, based on the validity of the CSI report.

In a twelfth aspect, alone or in combination with any of the tenth to eleventh aspects, wherein the processor and the memory are further configured to adjust a periodicity of the CSI report based on the validity of the CSI report.

In a thirteenth aspect, alone or in combination with any of the ninth to eleventh aspects, wherein the CSI correlation information includes at least one of a channel correlation coefficient measured on the reference signal or an interference correlation coefficient measured on the reference signal.

In a fourteenth aspect, alone or in combination with any of the ninth to eleventh aspects, wherein the CSI correlation information includes a CSI correlation coefficient that is determined at the UE based on a channel correlation coefficient and an interference correlation coefficient measured on the reference signal.

In a fifteenth aspect, alone or in combination with any of the ninth to eleventh aspects, wherein the reference signal information configures the UE to determine at least one of a channel correlation coefficient or an interference correlation coefficient based on the reference signal.

In a sixteenth aspect, alone or in combination with the ninth aspect, wherein the reference signal information configures the UE to determine a channel correlation coefficient based on measurements of the reference signal on a first set of resources and an interference correlation coefficient based on measurements of the reference signal on a second set of resources.

In a seventeenth aspect, alone or in combination with the sixteenth aspect, wherein the first set of resources and the second set of resources have different periodicities.

In an eighteenth aspect, a method of wireless communication at a user equipment (UE) is provided. The method includes receiving a reference signal from a scheduling entity; acquiring, based on the reference signal, channel state information (CSI) and CSI correlation information for determining a validity of a CSI report; and transmitting the CSI report to the scheduling entity, the CSI report comprising the CSI and the CSI correlation information.

In a nineteenth aspect, alone or in combination with the eighteenth aspect, the method further includes determining the CSI correlation information based on at least one of a channel correlation coefficient or an interference correlation coefficient.

In a twentieth aspect, alone or in combination with the nineteenth aspect, the method further includes: determining the channel correlation coefficient based on a first set of resources for receiving the reference signal; and determining the interference correlation coefficient based on a second set of resources for receiving the reference signal.

In a twenty-first aspect, alone or in combination with the twentieth aspect, wherein the first set of resources has a first periodicity, and the second set of resources has a second periodicity that is different from the first periodicity.

In a twenty-second aspect, alone or in combination with any of the nineteenth to twenty-first aspects, the method further includes determining the channel correlation coefficient and the interference correlation coefficient based on a third set of resources for receiving the reference signal.

In a twenty-third aspect, alone or in combination with any of the nineteenth to twenty-first aspects, the method further includes determining the CSI correlation information based on a minimum of the channel correlation coefficient and the interference correlation coefficient.

In a twenty-fourth aspect, alone or in combination with any of the nineteenth to twenty-first aspects, the method further includes determining the CSI correlation information based on one of the channel correlation coefficient and the interference correlation coefficient.

In a twenty-fifth aspect, alone or in combination with the eighteenth aspect, wherein the CSI report includes at least one of a channel correlation coefficient or an interference correlation coefficient, for determining a CSI correlation coefficient.

In a twenty-sixth aspect, a method of wireless communication at a scheduling entity is provided. The method includes: transmitting, to a user equipment (UE), reference signal information for configuring the UE to acquire channel state information (CSI) and CSI correlation information for determining a validity of a CSI report; transmitting a reference signal using resources according to the reference signal information; and receiving the CST report comprising the CST and the CSI correlation information.

In a twenty-seventh aspect, alone or in combination with the twenty-sixth aspect, the method further includes determining a validity of the CSI report based on the CSI correlation information.

In a twenty-eighth aspect, alone or in combination with the twenty-seventh aspect, the method further includes triggering an aperiodic CSI report from the UE, based on the validity of the CSI report.

In a twenty-ninth aspect, alone or in combination with any of the twenty-seventh to twenty-eighth aspects, the method further includes adjusting a periodicity of the CST report based on the validity of the CSI report.

In a thirtieth aspect, alone or in combination with any of the twenty-sixth to twenty-eighth aspects, wherein the CSI correlation information includes at least one of a channel correlation coefficient measured on the reference signal or an interference correlation coefficient measured on the reference signal.

In a thirty-first aspect, alone or in combination with any of the twenty-sixth to twenty-eighth aspects, wherein the CST correlation information includes a CSI correlation coefficient that is determined at the UE based on a channel correlation coefficient and an interference correlation coefficient measured on the reference signal.

In a thirty-second aspect, alone or in combination with any of the twenty-sixth to twenty-eighth aspects, wherein the reference signal information configures the UE to determine at least one of a channel correlation coefficient or an interference correlation coefficient based on the reference signal.

In a thirty-third aspect, alone or in combination with the twenty-sixth aspect, wherein the reference signal information configures the UE to determine a channel correlation coefficient based on measurements of the reference signal on a first set of resources and an interference correlation coefficient based on measurements of the reference signal on a second set of resources.

In a thirty-fourth aspect, alone or in combination with the thirty-third aspect, wherein the first set of resources and the second set of resources have different periodicities.

In a thirty-fifth aspect, a user equipment (UE) for wireless communication is provided. The UE includes: means for receiving a reference signal from a scheduling entity; means for acquiring, based on the reference signal, channel state information (CSI) and CSI correlation information for determining a validity of a CSI report; and means for transmitting the CSI report to the scheduling entity, the CSI report comprising the CSI and the CSI correlation information.

In a thirty-sixth aspect, a scheduling entity for wireless communication is provided. The scheduling entity includes: means for transmitting, to a user equipment (UE), reference signal information for configuring the UE to acquire channel state information (CSI) and CSI correlation information for determining a validity of a CSI report; means for transmitting a reference signal using resources according to the reference signal information; and means for receiving the CSI report comprising the CSI and the CSI correlation information.

In a thirty-seven aspect, a computer-readable medium stored with executable code for wireless communication is provided. The executable code includes instructions that cause a user equipment (UE) to: receive a reference signal from a scheduling entity; acquire, based on the reference signal, channel state information (CSI) and CSI correlation information for determining a validity of a CSI report; and transmit the CSI report to the scheduling entity, the CSI report comprising the CSI and the CSI correlation information.

In a thirty-eighth aspect, a computer-readable medium stored with executable code for wireless communication is provided. The executable code includes instructions that cause a scheduling entity to: transmit, to a user equipment (UE), reference signal information for configuring the UE to acquire channel state information (CSI) and CSI correlation information for determining a validity of a CSI report; transmit a reference signal using resources according to the reference signal information; and receive the CSI report comprising the CSI and the CSI correlation information.

In a thirty-ninth aspect, a user equipment (UE) for wireless communication is provided. The UE comprises: a transceiver for wireless communication; a memory; and a processor coupled to the transceiver and the memory, wherein the processor and the memory are configured to: receive, using the transceiver, channel state information reference signal (CSI-RS) information from a scheduling entity; acquire, based on the CSI-RS information, channel state information (CSI) and CSI correlation information for determining a validity of the CSI; and transmit, using the transceiver, a CSI report to the scheduling entity, the CSI report comprising the CSI and the CSI correlation information.

In a fortieth aspect, alone or in combination with the thirty-ninth aspect, wherein the processor and the memory are further configured to: determine the CSI correlation information based on at least one of a channel correlation coefficient or an interference correlation coefficient.

In a forty-first aspect, alone or in combination with the fortieth aspect, wherein the processor and the memory are further configured to: determine at least one of the channel correlation coefficient or the interference correlation coefficient, using a plurality of periodic resources indicated in the CSI-RS information.

In a forty-second aspect, alone or in combination with the forty-first aspect, wherein the processor and the memory are further configured to: determine the channel correlation coefficient using a first set of resources of the plurality of periodic resources; and determine the interference correlation coefficient using a second set of resources of the plurality of periodic resources.

In a forty-third aspect, alone or in combination with the forty-second aspect, wherein the first set of resources and the second set of resources are different in periodicity.

In a forty-fourth aspect, alone or in combination with any of the forty-first to forty-third aspects, wherein the processor and the memory are further configured to: receive, from the scheduling entity, a reference signal using the plurality of periodic resources; and determine the channel correlation coefficient based on a plurality of measurements of the reference signal, each measurement corresponding to one of the plurality of periodic resources.

In a forty-fifth aspect, alone or in combination with any of the forty-first to forty-third aspects, wherein the processor and the memory are further configured to: measure a channel interference between the UE and the scheduling entity using the plurality of periodic resources; and determine the interference correlation coefficient based on the channel interference that comprises a plurality of interference measurements, each interference measurement corresponding to one of the plurality of periodic resources.

In a forty-sixth aspect, alone or in combination with any of the forty to forty-third aspects, wherein the processor and the memory are further configured to: determine the CSI correlation information based on a comparison between the channel correlation coefficient and the interference correlation coefficient.

In a forty-seventh aspect, a method of wireless communication at a user equipment (UE) is provided. The method comprises: receiving, from a scheduling entity, channel state information reference signal (CSI-RS) information; acquiring, based on the CSI-RS information, channel state information (CSI) and CSI correlation information for determining a validity of the CSI; and transmitting a CST report to the scheduling entity, the CSI report comprising the CSI and the CSI correlation information.

In a forty-eighth aspect, alone or in combination with the forty-seventh aspect, the method further comprises: determining the CSI correlation information based on at least one of a channel correlation coefficient or an interference correlation coefficient.

In a forty-ninth aspect, alone or in combination with the forty-eighth aspect, the method further comprises: determining at least one of the channel correlation coefficient or the interference correlation coefficient, using a plurality of periodic resources indicated in the CSI-RS information.

In a fiftieth aspect, alone or in combination with the forty-ninth aspect, the method further comprises: determining the channel correlation coefficient using a first set of resources of the plurality of periodic resources; and determining the interference correlation coefficient using a second set of resources of the plurality of periodic resources.

In a fifty-first aspect, alone or in combination with the fiftieth aspect, wherein the first set of resources and the second set of resources are different in periodicity.

In a fifty-second aspect, alone or in combination with any of the forty-ninth to fifty-first aspects, the method further comprises, at least one of: receiving, from the scheduling entity, a reference signal using the plurality of periodic resources; and determining the channel correlation coefficient based on a plurality of measurements of the reference signal, each measurement corresponding to one of the plurality of periodic resources.

In a fifty-third aspect, alone or in combination with any of the forty-ninth to fifty-first aspects, the method further comprises: measuring a channel interference between the UE and the scheduling entity using the plurality of periodic resources; and determining the interference correlation coefficient based on the channel interference that comprises a plurality of interference measurements, each interference measurement corresponding to one of the plurality of periodic resources.

In a fifty-fourth aspect, a scheduling entity for wireless communication is provided. The scheduling entity comprises: a transceiver for wireless communication with a user equipment (UE); a memory; and a processor coupled to the transceiver and the memory, wherein the processor and the memory are configured to: transmit, to the UE using the transceiver, channel state information reference signal (CSI-RS) information for configuring the UE to acquire channel state information (CSI) and CSI correlation information for determining a validity of the CSI; and receive, from the UE using the transceiver, a CSI report comprising the CSI and the CSI correlation information.

In a fifty-fifth aspect, alone or in combination with the fifty-fourth aspect, wherein the processor and the memory are further configured to: determine the validity of the CSI based on the CSI correlation information that indicates whether the CSI reflects a current condition of a communication channel between the scheduling entity and the UE.

In a fifty-sixth aspect, alone or in combination with any of the fifty-fourth or fifty-fifth aspect, wherein the processor and the memory are further configured to: trigger an aperiodic CSI report from the UE in response to a determination that the CSI is valid.

In a fifty-seventh aspect, alone or in combination with any of the fifty-fourth or fifty-fifth aspect, wherein the processor and the memory are further configured to: adjust a periodicity of the CSI report based on the validity of the CSI.

In a fifty-eighth aspect, alone or in combination with any of the fifty-fourth or fifty-fifth aspect, wherein the CSI correlation information comprises, at least one of: a channel correlation coefficient measured on a reference signal transmitted using a plurality of periodic resources indicated by the CSI-RS information; or an interference correlation coefficient measured by the UE on the plurality of periodic resources indicated in the CSI-RS information.

In a fifty-ninth aspect, alone or in combination with the fifty-eighth aspect, wherein the processor and the memory are further configured to: determine the CSI correlation information based on a comparison between the channel correlation coefficient and the interference correlation coefficient.

In a sixtieth aspect, alone or in combination with the fifty-eighth aspect, wherein the CSI-RS information configures the UE to: determine the channel correlation coefficient using a first set of resources of the plurality of periodic resources; and determine the interference correlation coefficient using a second set of resources of the plurality of periodic resources.

In a sixty-first aspect, alone or in combination with the sixtieth aspect, wherein the first set of resources and the second set of resources have different periodicities.

In a sixtieth-second aspect, a method for wireless communication at a scheduling entity is provided. The method comprises: transmitting, to a user equipment (UE), channel state information reference signal (CSI-RS) information for configuring the UE to acquire channel state information (CSI) and CSI correlation information for determining a validity of the CSI; and receiving, from the UE, a CSI report comprising the CSI and the CSI correlation information.

In a sixty-third aspect, alone or in combination with the sixty-second aspect, the method further comprises: determining the validity of the CSI based on the CSI correlation information that indicates whether the CSI reflects a current condition of a communication channel between the scheduling entity and the UE.

In a sixty-fourth aspect, alone or in combination with any of the sixty-second or sixty-third aspect, the method further comprises, at least one of: triggering an aperiodic CSI report from the UE, in response to a determination that the CSI is invalid; or adjusting a periodicity of the CSI report based on the validity of the CSI.

In a sixty-fifth aspect, alone or in combination with any of the sixty-second or sixty-third aspect, wherein the CSI correlation information comprises, at least one of: a channel correlation coefficient measured on a reference signal transmitted using a plurality of periodic resources indicated by the CSI-RS information; or an interference correlation coefficient measured by the UE on the plurality of periodic resources indicated in the CSI-RS information.

In a sixty-sixth aspect, alone or in combination with the sixty-fifth aspect, the method further comprises: determining the CSI correlation information based on a comparison between the channel correlation coefficient and the interference correlation coefficient.

In a sixty-seventh aspect, alone or in combination with the sixty-fifth aspect, wherein the CSI-RS information configures the UE to: determine the channel correlation coefficient using a first set of resources of the plurality of periodic resources; and determine the interference correlation coefficient using a second set of resources of the plurality of periodic resources.

In a sixty-eighth aspect, alone or in combination with the sixty-seventh aspect, wherein the first set of resources and the second set of resources have different periodicities.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
    a transceiver for wireless communication;
    a memory; and
    a processor coupled to the transceiver and the memory, wherein the processor and the memory are configured to:

receive, using the transceiver, channel state information reference signal (CSI-RS) information from a scheduling entity;

acquire, based on the CSI-RS information, channel state information (CSI) and CSI correlation information for determining a validity of the CSI; and transmit, using the transceiver, a CSI report to the scheduling entity, the CSI report comprising the CSI and the CSI correlation information.

2. The UE of claim 1, wherein the processor and the memory are further configured to:

determine the CSI correlation information based on at least one of a channel correlation coefficient or an interference correlation coefficient.

3. The UE of claim 2, wherein the processor and the memory are further configured to:

determine at least one of the channel correlation coefficient or the interference correlation coefficient, using a plurality of periodic resources indicated in the CSI-RS information.

4. The UE of claim 3, wherein the processor and the memory are further configured to:

determine the channel correlation coefficient using a first set of resources of the plurality of periodic resources; and determine the interference correlation coefficient using a second set of resources of the plurality of periodic resources.

5. The UE of claim 4, wherein the first set of resources and the second set of resources are different in periodicity.

6. The UE of claim 3, wherein the processor and the memory are further configured to:

receive, from the scheduling entity, a reference signal using the plurality of periodic resources; and determine the channel correlation coefficient based on a plurality of measurements of the reference signal, each measurement corresponding to one of the plurality of periodic resources.

7. The UE of claim 3, wherein the processor and the memory are further configured to:

measure a channel interference between the UE and the scheduling entity using the plurality of periodic resources; and determine the interference correlation coefficient based on the channel interference that comprises a plurality of interference measurements, each interference measurement corresponding to one of the plurality of periodic resources.

8. The UE of claim 2, wherein the processor and the memory are further configured to:

determine the CSI correlation information based on a comparison between the channel correlation coefficient and the interference correlation coefficient.

9. A method of wireless communication at a user equipment (UE), the method comprising:

receiving, from a scheduling entity, channel state information reference signal (CSI-RS) information;

acquiring, based on the CSI-RS information, channel state information (CSI) and CSI correlation information for determining a validity of the CSI; and transmitting a CSI report to the scheduling entity, the CSI report comprising the CSI and the CSI correlation information.

10. The method of claim 9, further comprising:

determining the CSI correlation information based on at least one of a channel correlation coefficient or an interference correlation coefficient.

11. The method of claim 10, further comprising:

determining at least one of the channel correlation coefficient or the interference correlation coefficient, using a plurality of periodic resources indicated in the CSI-RS information.

12. The method of claim 11, further comprising:

determining the channel correlation coefficient using a first set of resources of the plurality of periodic resources; and determining the interference correlation coefficient using a second set of resources of the plurality of periodic resources.

13. The method of claim 12, wherein the first set of resources and the second set of resources are different in periodicity.

14. The method of claim 11, further comprising, at least one of:

receiving, from the scheduling entity, a reference signal using the plurality of periodic resources; and determining the channel correlation coefficient based on a plurality of measurements of the reference signal, each measurement corresponding to one of the plurality of periodic resources.

15. The method of claim 11, further comprising:

measuring a channel interference between the UE and the scheduling entity using the plurality of periodic resources; and determining the interference correlation coefficient based on the channel interference that comprises a plurality of interference measurements, each interference measurement corresponding to one of the plurality of periodic resources.

16. A scheduling entity for wireless communication, comprising:

a transceiver for wireless communication with a user equipment (UE);

a memory; and a processor coupled to the transceiver and the memory, wherein the processor and the memory are configured to:

transmit, to the UE using the transceiver, channel state information reference signal (CSI-RS) information for configuring the UE to acquire channel state information (CSI) and CSI correlation information for determining a validity of the CSI; and receive, from the UE using the transceiver, a CSI report comprising the CSI and the CSI correlation information.

17. The scheduling entity of claim 16, wherein the processor and the memory are further configured to:

determine the validity of the CSI based on the CSI correlation information that indicates whether the CSI reflects a current condition of a communication channel between the scheduling entity and the UE.

18. The scheduling entity of claim 17, wherein the processor and the memory are further configured to:

trigger an aperiodic CSI report from the UE in response to a determination that the CSI is valid.

19. The scheduling entity of claim 17, wherein the processor and the memory are further configured to:

adjust a periodicity of the CSI report based on the validity of the CSI.

20. The scheduling entity of claim 16, wherein the CSI correlation information comprises, at least one of:

a channel correlation coefficient measured on a reference signal transmitted using a plurality of periodic resources indicated by the CSI-RS information; or an interference correlation coefficient measured by the UE on the plurality of periodic resources indicated in the CSI-RS information.

21. The scheduling entity of claim 20, wherein the processor and the memory are further configured to:
    determine the CSI correlation information based on a comparison between the channel correlation coefficient and the interference correlation coefficient.

22. The scheduling entity of claim 20, wherein the CSI-RS information configures the UE to:
    determine the channel correlation coefficient using a first set of resources of the plurality of periodic resources; and
    determine the interference correlation coefficient using a second set of resources of the plurality of periodic resources.

23. The scheduling entity of claim 22, wherein the first set of resources and the second set of resources have different periodicities.

24. A method for wireless communication at a scheduling entity, comprising:
    transmitting, to a user equipment (UE), channel state information reference signal (CSI-RS) information for configuring the UE to acquire channel state information (CSI) and CSI correlation information for determining a validity of the CSI; and
    receiving, from the UE, a CSI report comprising the CSI and the CSI correlation information.

25. The method of claim 24, further comprising:
    determining the validity of the CSI based on the CSI correlation information that indicates whether the CSI reflects a current condition of a communication channel between the scheduling entity and the UE.

26. The method of claim 25, further comprising, at least one of:
    triggering an aperiodic CSI report from the UE, in response to a determination that the CSI is invalid; or
    adjusting a periodicity of the CSI report based on the validity of the CSI.

27. The method of claim 24, wherein the CSI correlation information comprises, at least one of:
    a channel correlation coefficient measured on a reference signal transmitted using a plurality of periodic resources indicated by the CSI-RS information; or
    an interference correlation coefficient measured by the UE on the plurality of periodic resources indicated in the CSI-RS information.

28. The method of claim 27, further comprising:
    determining the CSI correlation information based on a comparison between the channel correlation coefficient and the interference correlation coefficient.

29. The method of claim 27, wherein the CSI-RS information configures the UE to:
    determine the channel correlation coefficient using a first set of resources of the plurality of periodic resources; and
    determine the interference correlation coefficient using a second set of resources of the plurality of periodic resources.

30. The method of claim 29, wherein the first set of resources and the second set of resources have different periodicities.

* * * * *